US006777510B1

(12) United States Patent
Philipp et al.

(10) Patent No.: US 6,777,510 B1
(45) Date of Patent: Aug. 17, 2004

(54) INTERNAL LEWIS ACID SINGLE SITE CATALYST FAMILY FOR POLYMERIZATION OF POLAR MONOMERS

(75) Inventors: Dean M. Philipp, Pasadena, CA (US); Richard P. Muller, Pasadena, CA (US); William A. Goddard, III, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 09/954,518

(22) Filed: Sep. 12, 2001

Related U.S. Application Data

(60) Provisional application No. 60/232,446, filed on Sep. 12, 2000.

(51) Int. Cl.[7] ............................... C08F 4/70; C08F 4/72
(52) U.S. Cl. .................... 526/172; 526/161; 526/169.1; 526/329.7; 526/344; 526/341; 502/150; 502/155; 502/162; 502/167; 502/213; 556/32
(58) Field of Search ................................. 502/150, 155, 502/162, 167, 213; 526/161, 172, 169.1

(56) References Cited

U.S. PATENT DOCUMENTS

| 4,544,762 A | 10/1985 | Kaminsky et al. |
| 5,003,095 A | 3/1991 | Beard |
| 5,015,749 A | 5/1991 | Schmidt et al. |
| 5,057,475 A | 10/1991 | Canich et al. |
| 5,234,878 A | 8/1993 | Tsutsui et al. |

FOREIGN PATENT DOCUMENTS

WO        WO98/27124        6/1998

OTHER PUBLICATIONS

Mecking et al., J. Amer. Chem. Soc. 120 (1998) 888–899.*
Tempel et al., J. Amer. Chem. Soc. 122 (2000) 6686–6700.*
Boffa et al., "Copolymerization of Polar Monomers with Olefins Using Transition–Metal Complexes", *Chemical Reviews*, (Apr. 2000), 100:1479–1493.
Kesti et al., "Homogenous Zeigler—Natta Polymerization of Functionalized Monomers Catalyzed by Cationic Group IV Metallocenes", *Journal of the American Chemical Society*, (Nov. 1992) 114:9679–9680.
Deng et al., A Density Functional Study of Nickel (II) Diimide Catalyzed Polymerization of Ethylene, *Journal of the American Chemical Society*, (Feb. 1997) 119:1094–1100.
Musaev et al., "A Density Functional Study of the Mechanism of the Diimine—Nickel Catalyzed Ethylene Polymerization Reaction", *Journal of the American of Chemical Society*, (Jan. 1997) 119:367–374.
Johnson et al., "New Pd(II) and Ni(II)–Based Catalysts for Polymerization of Ethylene and α–Olefins", *Journal of the American Chemical Society*, (Jun. 1995) 117:6414–6415.

Ewen et al., "Syndiospecific Propylene Polymerizations with Group 4 Metallocenes", *Journal of the American Chemical Society*, (Aug. 1988) 110:6255–6256.
Coughlin et al, "Iso–Specific Ziegler—Natta Polymerization of α–Olefins with a Single–Component Organoyttrium Catalyst", *Journal of the American Chemical SOciety*, (Sep. 1992) 114:7606–7607.
Mecking et al., "Mechanistic Studies of the Palladium–Catalyzed Copolymerization of Ethylene and α–Olefins with Methyl Acrylate", *Journal of the American Chemical Society*, (Feb. 1998) 120:888—899.
Ewen, John A., "Mechanisms of Stereochemical Control in Propylene Polymerizations with Soluble Group 4B Metallocene/Methylalumoxane Catalysts", *Journal of the American Chemical Society*, (Oct. 1984) 106:6355–6364.
Small et al., "Highly Active Iron and Cobalt Catalysts for the Polymerization of Ethylene", *Journal of the American Chemical Society*, (Apr. 1998) 120:4049–4050.
Tempel et al., "Mechanistic Studies of Pd(II)—α– Diimine–Catalyzed Olefin Polymerizations", *Journal of the American Chemical Society*, (Jul. 2000) 122:6686–6700.
Cossee, P., "Ziegler–Natta Catalysis I. Mechanisms of Polymerization of α–Olefins with Ziegler–Natta Catalysts", *Journal of Catalysis*, (1964) 3:80–88.
Arlman, E.J., "Ziegler–Natta Catalysis II. Surface of Layer–Lattice Transition Metal Chlorides", *Journal of Catalysis*, (1964) 3:89–98.
Arlman et al., "Ziegler–Natta Catalysis III. Stereospecific Polymerization of Propene with th Catalyst System $TiCl_3$–$AlEt_3$", *Journal of Catalysis*(1964), 3:99–104.
Andresen et al., "Halogen–Free Soluble Ziegler Catalysts for the Polymerization of Ethylene, Control of Molecular Weight by Choice of Temperature", *Angewandte Chemie. Int'l. Edition in English*, (1976) 15:630–632.
Kaminsky et al., "Polymerization of Propene and Butene with a Chiral Zirconocene and Methylalumoxane as Cocatalyst", *Angewandte Chemie, Int'l. Edition in English*, (1985) 24:507–508.
Britovsek, et al., "Novel Olefin Polymerization Catalysts Based on Iron and Cobalt", *Chemical Communications*, (1998) 849–850.
Musaev et al., "Density Functional Study of the Mechanism of the Palladium (II)–Catalyzed Ethylene Polymerization Reaction", *Organometallics*, (Apr. 1997) 16:1933–1945.

(List continued on next page.)

*Primary Examiner*—Roberto Rabago
(74) *Attorney, Agent, or Firm*—Fish & Richardson P.C.

(57) ABSTRACT

Rational combinatorial computational methods use accurate quantum mechanical and molecular modeling techniques to identify optimum polymerization catalysts for polar olefins. Using mechanistic information to model the polymerization reaction, the methods systematically vary components of a catalyst template to calculate a potential energy surface for a number of catalyst candidates. The potential energy surfaces are compared to identify a catalyst for the catalytic polymerization reaction. Internal Lewis acid single site polar olefin polymerization catalyst compositions and compounds for polymerizing polar olefins are also described.

5 Claims, 28 Drawing Sheets

OTHER PUBLICATIONS

Chung, T.C., "Synthesis of Polyalcohols Via Zielger–Natta Polymerization", *Macromolecules*, (Mar. 1988) 21:865–869.

Chung et al., "Kinetic Aspects of the Copolymerization Between α–Olefins and Borane Monomer in Ziegler–Natta Catalyst", *Macromolecules*, (Jun. 1993) 26:3019–3025.

Aaltonen et al., "Synthesis of Functional Polyethylene with Soluble Metallocene/Methylaluminoxane Catalyst", *Macromolecules*, (Jul. 1995) 28:5353–5357.

Galimberti, et al., "Functionalized Polymers from Ziegler–Natta Catalysts", *Journal of Molecular Catalysis*, (Jul. 1995) 101:1–10.

Becke, A.D., "Density–Functional Exchange–Energy Approximation With Correct Asymptotic Behavior", *Physical Review A: General Physics*, (Sep. 1988) 38:3098–3100.

Becke, A. D., "Density–Functional Thermochemistry, III. The Role of Exact Exchange", *The Journal of Chemical Physics*, (Apr. 1993) 98:5648–5652.

Vosko et al., "Accurate Spin–Dependent Electron Liquid Correlation Energies for Local Spin Density Calculations: A Critical Analysis", *Canadian Journal of Physics*, (Aug. 1980) 58:1200–1211.

Chengteh et al., "Development of the Colle–Salveti Correlation–Energy Formula Into a Functional of the Electron Density", *Physical Review B: Condensed Matter*, (Jan. 1988) 37:785–789.

Hay et al., "Ab Initio Effective Core Potentials for Molecular Calculations. Potentials for K to Au Including the Outermost Core Orbitals", *The Journal of Chemical Physics*, (Jan. 1985) 82:299–310.

Tannor et al., "Accurate First Principles Calculation of Molecular Change Distributions and Solvation Energies from Ab Initio Quantum Mechanics and Continuum Dielectric Theory", *Journal of the American Chemical Society*, (Dec. 1994) 116:11875–11882.

Marten et al., "New Model for Calculation of Solvation Free Energies: Correction of Self–Consistent Reaction Field Continuum Dielectric Theory forShort–Range Hydrogen–Bonding Effects", *The Journal of Physical Chemistry*, (Jul. 1996) 100:11775–11788.

Cortis et al., "An Automatic Three–Dimensional Finite Element Mesh Generation System for the Poisson–Boltzmann Equation", *Journal of Computational Chemistry*, (1997) 18:1570–1590.

\* cited by examiner

INTERNAL LEWIS ACID SINGLE SITE CATALYST FAMILY FOR POLYMERIZATION OF POLAR MONOMERS

CROSS-REFERENCE TO RELATED APPLICATIONS

This application claims the benefit of Provisional Application No. 60/232,446, filed on Sep. 12, 2000, which is incorporated by reference herein.

TECHNICAL FIELD

This invention relates to the polymerization of olefinic monomers and compositions for catalyzing the polymerization of such monomers.

BACKGROUND

A revolution in the polymers industry has occurred over the last decade in which Single Site Organometallic Catalysts have been developed that lead to rapid polymerization of ethylene, propylene and other nonpolar olefins. The resulting polymers and co-polymers have excellent and controllable tacticity and other properties, with microstructures often tunable by the ligands in the catalyst. One generation of catalysts involves early transition metal metallocenes (pioneered by Kaminsky, Ewen, Brintzinger, and Bercaw and developed by Dow, Exxon, and other companies), as disclosed in A. Andersen, et al., *Angew. Chem., Int. Ed. Engl.* 1976, 15, 630; J. Ewen, *J. Am. Chem. Soc.* 1984, 106, 6355; W. Kaminsky, et al., *Angew. Chem., Int. Ed. Engl.* 1985, 24, 507; J. Ewen, et al., *J. Am. Chem. Soc.* 1988, 110, 6255; E. Coughlin, et al., *J. Am. Chem. Soc.* 1992, 114, 7606; U.S. Pat. Nos. 5,015,749; 5,057,475; 4,544,762, 1985; 5,234,878, 1993; and U.S. Pat. No. 5,003,095, 1995. Another involves late transition metal di-imines or tri-imines (pioneered by Brookhart and Gibson and developed by Dupont), as disclosed in L. Johnson, et al., *J. Am. Chem. Soc.* 1995, 117, 6414; B. Small, et al., *J. Am. Chem. Soc.* 1998, 120, 4049; G. Britovsek, et al., *Chem. Commun.* 1998, 849; WO 96/23010; and WO 98/27124.

Despite the industrial success of these catalysts, however, there remain many important challenges in developing catalysts for important polymers. In particular, the current generations of catalysts are generally not effective with important polar monomers such as vinyl chloride, methyl acrylates, vinyl acetate, and acrylonitrile. Indeed, the activity of current catalysts to polymerize monomers containing polar functionalities has been limited to the polymerization of large monomers with the polar group far removed from the vinyl moiety. See, e.g. T. Chung, *Macromolecules* 1988, 21, 865; T. Chung, et al., *Macromolecules* 1993, 26, 3019; M. Kesti, et al., *J. Am. Chem. Soc.* 1992, 114, 9679; P. Aaltonen, et al., *Macromolecules* 1995, 28, 5353; M. Galimberti, et al., *J. Mol. Catal.* 1995, 101, 1; and S. Mecking, et al., *J. Am. Chem. Soc.* 1998, 120, 888. For other polar monomers, these catalysts are generally inactive or become poisoned in the presence of basic polar monomers.

SUMMARY

Using the techniques described herein, the invention provides catalysts that overcome the problems associated with existing olefin polymerization catalysts and provide for the efficient catalysis of the polymerization of a variety of polar monomers.

In general, in one aspect, the invention provides catalyst compositions for use in an olefin polymerization process. The compositions include a late transition metal, and a ligand completed with the late transition metal. The late transition metal is selected from the (IUPAC convention) Group 7 (Mn column), Group 8 (Fe column), Group 9 (Co column), Group 10 (Ni column) and Group 11 (Cu column) transition metals. The ligand is characterized by the general formula:

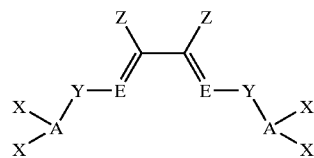

Each E is an electronegative atom capable of donating electrons to the late transition metal. Each Y is a linking group independently selected from —O—, —NR—, —CR$_2$—, —S—, —PR—, —SiR$_2$—, and —G(CR$_2$)$_m$—, where each R is a substituent independently selected from H, halide, alkyl, substituted alkyl, heteroalkyl, aryl, substituted aryl, and heteroaryl, and where one or more R substituents can be incorporated in a ring structure, G is selected from O, N, and CR$_2$, and m is an integer greater than or equal to 1. Each A is a Lewis acid, Each X is an electron-withdrawing group independently selected from Cl, F, Br, I, CF$_3$, C$_6$F$_5$, H, alkyl, C$_6$H$_5$, C$_6$R$_5$, and CR$_3$, where each R is a substituent independently selected from H, halide, alkyl, substituted alkyl, heteroalkyl, aryl, substituted aryl, and heteroaryl, and where one or more R substituents can be incorporated in a ring structure. Each Z is a substituent independently selected from H, halide, alkyl, substituted alkyl, heteroalkyl, aryl, substituted aryl, and heteroaryl, where one or more of X, Y and/or Z can be incorporated in a ring structure. Therein the late transition metal is also complexed with one or more additional ligands that are capable of adding to an olefin in a polymerization process and/or that are capable of being displaced by the olefin.

Particular embodiments can include one or more of the following features. E can be independently N or P. Each A can be independently selected from Al, B, Ga, In, Tl, Sc, Y, La and Lu. The late transition metal can be nickel, palladium or platinum. The late transition metal can be nickel, palladium or platinum, A can be aluminum or scandium, Y can be —O—, —S—, or —CH$_2$—, X can be Cl, F, CF$_3$ or H, and Z can be H.

In general, in another embodiment, the invention provides compounds characterized by the general formula:

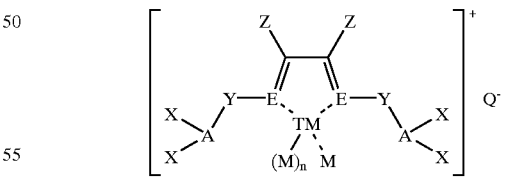

TM is a late transition metal selected from the Group 7–11 transition metals. Each E is an electronegative atom capable of donating electrons to the late transition metal. Each Y is a linking group independently selected from —O—, —NR—, —CR$_2$—, —S—, —PR—, —SiR$_2$—, and —G(CR$_2$)$_m$—, where each R is a substituent independently selected from H, halide, alkyl, substituted alkyl, heteroalkyl, aryl, substituted aryl, and heteroaryl, and where one or more R substituents can be incorporated in a ring structure, G is selected from O, N, and CR$_2$, and m is an integer greater than or equal to 1. Each A is a Lewis acid. Each X is an electron-withdrawing group independently selected from Cl, F, Br, I, $CF_3$, $C_6F_5$, H, alkyl, $C_6H_5$, $C_6R_5$, and $CR_3$, where each R is a substituent independently selected from H, halide, alkyl, substituted alkyl, heteroalkyl, aryl, substituted aryl, and heteroaryl, and where one or more R substituents can be incorporated in a ring structure, Each Z is a substituent independently selected from H, halide, alkyl, substituted alkyl, heteroalkyl, aryl, substituted aryl, and heteroaryl, where one or more of X, Y and/or Z can be incorporated in a ring structure. M is a polymerizable olefinic monomer, and n is an integer greater than or equal to one, such that $(M)_n$ is polymer derived from one or more olefinic monomer subunits. $Q^-$ is a weakly coordinating anion.

Particular embodiments can include one or more of the following features. E can be independently N or P. Each A can be independently Al, B, Ga, In, Tl, Sc, Y, La or Lu. The late transition metal can be nickel, palladium or platinum. The late transition metal can be nickel, palladium or platinum, A can be aluminum or scandium, Y can be —O—, —S—, or —$CH_2$—, X can be Cl, F, $CF_3$ or H, and Z can be H. $(M)_n$ can be a polymer derived from at least one polar functionalized α-olefin. The α-olefin(s) can be selected from vinyl chloride, vinyl acetate, acrylonitrile, methyl acrylate, methyl methacrylate, methyl vinyl ketone, and chloroprene. $(M)_n$ can be a copolymer derived from the one polar functionalized α-olefin(s) and at least one non-polar α-olefin. The non-polar α-olefin can be ethylene, propylene, butene, styrene, butadiene, or norbornene.

In general, in still another aspect, the invention provides methods for polymerizing polar olefinic monomers. The methods include contacting a catalyst composition or compound as described above with at least one polar olefinic monomer under polymerization conditions sufficient to polymerize the at least one polar olefinic monomer. Copolymers with additional polar olefinic monomers or non-polar monomers can also be produced.

In general, in a fourth aspect, the invention provides computer-implemented methods for identifying polymerization catalyst for a polar olefin. The methods include providing mechanism information for a catalytic polymerization reaction, providing a catalyst template, assigning values to each of a plurality of variables representing the components of the catalyst template, systematically varying the values to generate a catalyst candidate, using the mechanism information to calculate a potential energy surface for each of the catalyst candidates, and comparing the potential energy surfaces to identify a catalyst for the catalytic polymerization reaction.

The mechanism information includes electronic data representing intermediates and transition states of the catalytic polymerization reaction. The catalyst template includes electronic data representing a catalyst structure characterized by the general formula:

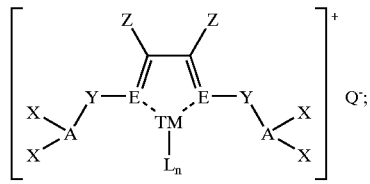

The values include: a value for TM representing a late transition metal from the Group 7–11 transition metals; one or more values for E, each representing an electronegative atom capable of donating electrons to the late transition metal; one or more values for Y, each representing a linking group independently selected from —O—, —NR—, —$CR_2$—, —S—, —PR—, —$SiR_2$—, and —$G(CR_2)_m$—, wherein each R is a substituent independently selected from H, halide, alkyl, substituted alkyl, heteroalkyl, aryl, substituted aryl, and heteroaryl, and wherein one or more R substituents can be incorporated in a ring structure, G is selected from O, N, and $CR_2$, and m is an integer greater than or equal to 1; one or more values for A, each representing a Lewis acid; one or more values for X, each representing an electron-withdrawing group independently selected from Cl, F, Br, I, $CF_3$, $C_6F_5$, H, alkyl, $C_6H_5$, $C_6R_5$, and $CR_3$, where each R is a substituent independently selected from H, halide, alkyl, substituted alkyl, heteroalkyl, aryl, substituted aryl, and heteroaryl, and where one or more R substituents can be incorporated in a ring structure; one or more values for Z, each representing a substituent independently selected from H, halide, alkyl, substituted alkyl, heteroalkyl, aryl, substituted aryl, and heteroaryl, where one or more of X, Y and/or Z can be incorporated in a ring structure; one or more values for L, representing a plurality of ligands, the plurality of ligands including one or more polarizable monomers, a polymer derived from one or more polarizable monomers, and one or more additional ligands satisfying additional coordination sites of TM or adjusting an oxidation state of TM; and a value for $Q^-$, representing a weakly coordinating anion.

In particular embodiments, the method can further include varying a value representing a salvation energy of the candidate catalysts. Comparing the potential energy surfaces can include performing a screening test for each of a plurality of candidate catalysts, by comparing an energy difference between two or more intermediate structures on the potential energy surfaces for each of the plurality of candidate catalysts, and selecting one or more of the plurality of candidate catalysts for further analysis based on the results of the screening test.

Among the advantages of the invention are one or more of the following. The catalysts described herein can produce high molecular weight polymers from polar monomers. The catalysts described herein can produce copolymers with controllable sequences of polar and non-polar monomers. The catalysts described herein can provide control over the degree of tacticity during olefin polymerization, leading, for example, to purely isotactic or purely syndiotactic polymers. The catalysts described here can provide control over polymer microstructure induced by selective cross-linking. The optimization techniques described herein can provide for the efficient identification of catalysts providing one or more of these advantages tailored to a particular monomer system.

The details of one or more embodiments of the invention are set forth in the accompanying drawings and the description below. Other features, objects, and advantages of the invention will be apparent from the description and drawings, and from the claims.

DESCRIPTION OF DRAWINGS

In FIGS. 3, 4 and 5, the top curves represents the insertion of a monomer unit after a prior insertion of ethylene, the bottom left curves show subsequent addition of a second monomer unit, and the bottom right curves show subsequent addition of ethylene. In FIG. 6, the curves represent insertion of an acrylonitrile unit after a prior insertion of ethylene. In each figure, solid curves include solvation effects (with a dielectric constant and probe radius representative of methylene chloride solvent), while dotted curves are gas-phase results.

Like reference symbols in the various drawings indicate like elements.

DETAILED DESCRIPTION

Figure 1:
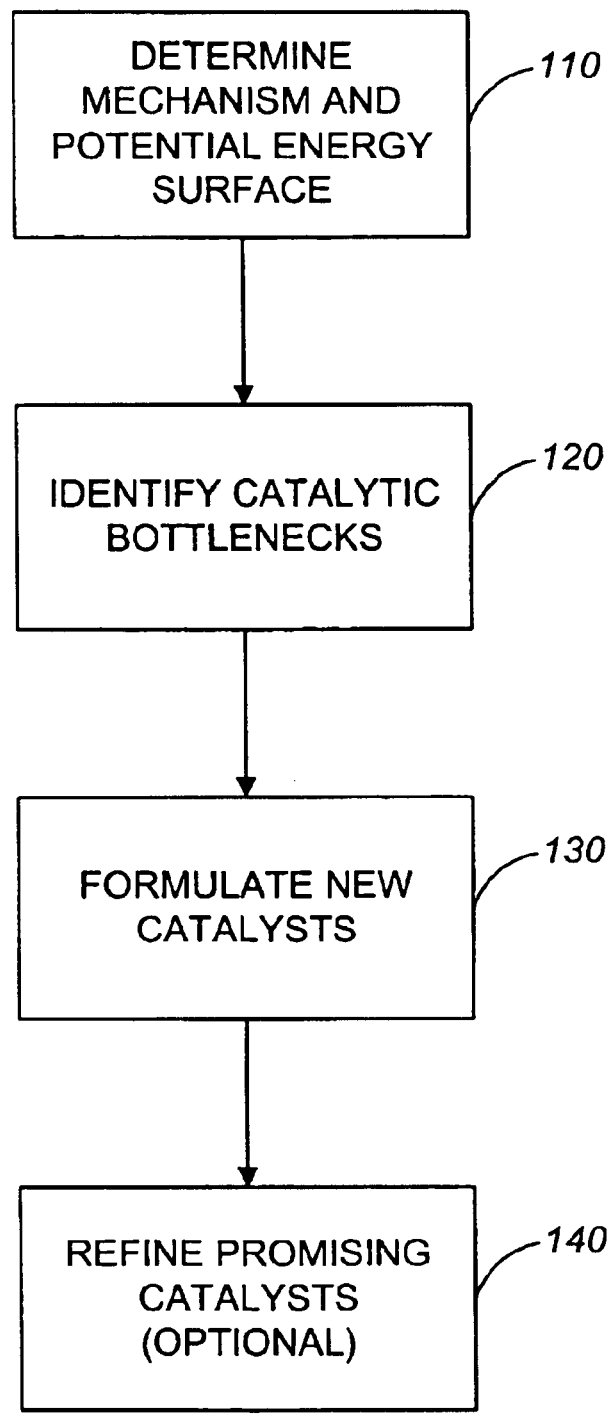
FIG. 1 is a flow diagram illustrating a computational method for identifying new catalysts according to the present invention.

The invention provides catalysts optimized for the polymerization of polar olefinic monomers, as well as methods for identifying catalysts optimized for particular polar olefinic monomers. Current catalysts, as exemplified by the Pd di-imine catalysts of Brookhart et al., have been shown to catalyze the polymerization of ethylene and certain other olefinic monomers according to the mechanism shown in Scheme 1:

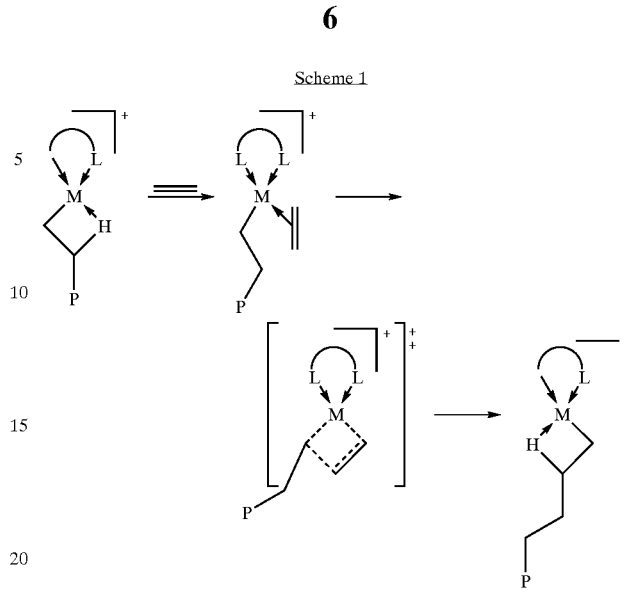

As discussed above, however, these catalysts are not effective with most monomers that include polar functionalities, except for large monomers in which the polar group is far removed from the vinyl moiety. As discussed in more detail below, quantum mechanical calculations suggest the reason for this inactivity—that the polar end of the monomer binds so strongly to the metal (and in some cases even dissociates onto the metal) that barriers to subsequent monomer insertion are too large to give reasonable rates of the desired products (or low molecular weight of the polymer). These problems can be overcome by the use of a rational combinatorial computational approach to design new catalysts based on a modified reaction path.

As used herein, the phrase "characterized by the formula" is not intended to be limiting and is used in the same way that "comprising" is commonly used. The term "independently selected" is used herein to indicate that groups, e.g., individual E, A, X, Y, Z or other components, can be identical or different (e.g. X substituents in a particular compound may all be substituted alkyls or some X substituents in a compound may be substituted alkyls, while others are aryls, etc.). A named group will generally have the structure that is recognized in the art as corresponding to groups having that name. For the purposes of illustration, representative R groups as enumerated above are defined below. These definitions are intended to supplement and illustrate, not supercede, the definitions known to those of skill in the art.

As used in this specification, the term "alkyl" refers to a straight-chained or branched, saturated or unsaturated, cyclic or acyclic hydrocarbon radical. Suitable alkyl radicals include, for example, methyl, ethyl, n-propyl, isopropyl, allyl, hexyl, vinyl, n-butyl, tert-butyl, iso-butyl, cyclopentyl, cyclohexyl, cyclooctenyl, bicyclooctyl, and the like. Typical alkyl groups will include between about 1 and 50 carbon atoms, or between 1 and 20 carbon atoms.

"Substituted alkyl" refers to an alkyl as just described in which one or more hydrogen atom bonded to any carbon of the alkyl is replaced by another group such as a halogen, alkyl, heteroalkyl, aryl, substituted aryl, heteroaryl, alkoxy, aryloxy, boryl, phosphino, amino, silyl, thio, or the like. Suitable substituted alkyls include, for example, benzyl, trifluoromethyl, 4-dimethylaminocyclohexyl, 4,5-dibromocyclohept-4-enyl, and the like.

The term "heteroalkyl" refers to alkyl or substituted alkyl groups as described above in which one or more carbon atoms of the alkyl is replaced by a heteroatom such as boron, nitrogen, oxygen, sulfur, phosphorous or silicon. The bond between the carbon atom and the heteroatom may be saturated or unsaturated. Thus, the term heteroalkyl includes alkyl groups substituted with heterocycloalkyl, substituted heterocycloalkyl, heteroaryl, substituted heteroaryl, alkoxy, aryloxy, boryl, phosphino, amino, silyl, or thio substituents. Suitable heteroalkyls include cyano, benzoyl, 2-pyridyl, 2-furyl, $Me_3SiOCH_2(CH_3)_2C$—, piperazinyl, morpholinyl, tetrahydropyranyl, tetrahydrofuranyl, piperidinyl, pyrrolidinyl, oxazolinyl, and the like.

"Aryl" refers to an aromatic substituent which may include one aromatic ring or multiple aromatic rings that are fused together, or joined by a covalent bond or linking group such as a methylene or ethylene moiety. The common linking group may also include a carbonyl as in benzophenone, an oxygen atom as in diphenylether or a nitrogen in diphenylamine. The aromatic ring(s) may include phenyl, naphthyl, biphenyl, diphenylether, diphenylamine, benzophenone, and the like. Typical aryls will include between about 1 and 50 carbon atoms, or between 1 and 20 carbon atoms.

"Substituted aryl" refers to aryl as just described in which one or more hydrogen atom bonded to any carbon is replaced by another group such as a halogen, alkyl, heteroalkyl, heteroaryl, alkoxy, aryloxy, boryl, phosphino, amino, silyl, thio, or the like. Specific example of substituted aryls include perfluorophenyl, chlorophenyl, 3,5-dimethylphenyl, 2,6-diisopropylphenyl and the like.

"Heteroaryl" refers to aryl or substituted aryl groups as described above in which one or more carbon atoms of the aromatic ring(s) are replaced by one or more heteroatoms such as nitrogen, oxygen, boron, phosphorus, silicon or sulfur. Suitable heteroaryl groups can include, for example, thiophene, pyridine, isoxazole, phthalimide, pyrazole, indole, furan, and the like.

The term "alkoxy" refers to the —$OZ^1$ radical, where $Z^1$ includes alkyl, substituted alkyl, substituted alkyl, heteroalkyl, or silyl groups as described herein. Suitable alkoxy radicals include, for example, methoxy, ethoxy, benzyloxy, t-butoxy, etc. Similarly, "aryloxy" refers to similar moieties in which $Z^1$ includes aryl, substituted aryl, or heteroaryl groups as described above. Examples of suitable aryloxy radicals include phenoxy, substituted phenoxy, 2-pyridinoxy, 8-quinalinoxy and the like.

The term "silyl" refers to the —$SiZ^1Z^2Z^3$ radical, where each of $Z^1$, $Z^2$, and $Z^3$ is independently selected from the group consisting of alkyl, substituted alkyl, heteroalkyl, aryl, substituted aryl, heteroaryl, alkoxy, aryloxy, amino, silyl and or the like.

"Boryl" refers to the —$BZ^1Z^2$ group, where each of $Z^1$ and $Z^2$ is independently selected from the group consisting of alkyl, substituted alkyl, heteroalkyl, aryl, substituted aryl, heteroaryl, alkoxy, aryloxy, amino, silyl or the like.

As used herein, the term "phosphino" refers to the group —$PZ^n$, where each of $Z^n$ is independently selected from the group consisting of hydrogen, oxygen, alkyl, substituted alkyl, heteroalkyl, aryl, substituted heteroaryl, alkoxy, aryloxy, silyl, amino and the like, where n is 1 to 4 depending on the phosphorus oxidation state.

The term "amino" refers to the group —$NZ^1Z^2$, where each of $Z^1$ and $Z^2$ is independently selected from the group consisting of hydrogen, alkyl, substituted alkyl, heteroalkyl, aryl, substituted aryl, heteroaryl, alkoxy, aryloxy, silyl and the like.

"Thio" refers to the group —$SZ^1$, where $Z^1$ is selected from the group consisting of hydrogen, alkyl, substituted alkyl, heteroalkyl, aryl, substituted aryl, heteroaryl, alkoxy, aryloxy, silyl and the like.

In one embodiment, a class of Internal Lewis Acid Single Site Polar Olefin Polymerization Catalysts (ILA-SS-POPC) for polymerizing polar monomers can be represented by the general formula 1:

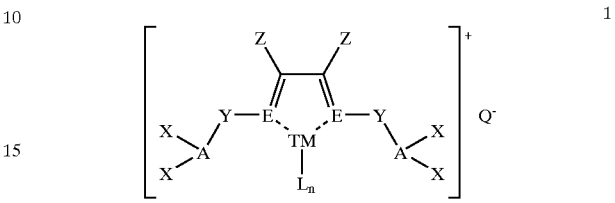

where TM is a late transition metal from the Group 7, Group 8, Group 9, Group 10 or Group 11 transition metals; each E is an electronegative atom capable of donating electrons to the late transition metal such as N or P; each Y is a linking group such as —O—, —NR—, —$CR_2$—, —S—, —PR—, —$SiR_2$—, and —$G(CR_2)_m$—, where each R is a substituent selected from the group consisting of H, halo, alkyl, substituted alkyl, heteroalkyl, aryl, substituted aryl, and heteroaryl, and where one or more R substituents can be incorporated in a ring structure, G is O, N, or $CR_2$, and m is an integer greater than or equal to 1; each A is a Lewis acid such as Al, B, Ga, In, Tl, Sc, Y, La, Lu, or other Lewis acids; each X is an electron-withdrawing group selected from the group consisting of Cl, F, $CF_3$, $C_6F_5$, H, alkyl, $C_6H_5$, $C_6R_5$, and $CR_3$, where R is a substituent as described above for Y (and where R groups for multiple R ligands such as $C_6R_5$ can be different, making it possible, e.g., to vary the para substituent of a phenyl to optimize sigma and pi donation characteristics); each Z is a substituent selected from the group consisting of H, halo, alkyl, substituted alkyl, heteroalkyl, aryl, substituted aryl, and heteroaryl, where one or more of X, Y and/or Z can be incorporated in a ring structure; L is any ligand capable of occupying a metal coordination site and of being displaced by a polar olefin monomer; n is an integer greater than or equal to one; and $Q^-$ is a weakly coordinating anion (such as MAO or $B(Ar)_4$, where Ar=3,5-$C_6H_3(CF_3)_2$). For a given compound 1, each E, X, Y, A, Z and/or L can be the same or different. Optionally, compounds according to formula 1 can also include one or more additional ligands (which may be the same or different) to satisfy additional coordination sites of metal center TM, and/or to adjust the metal's oxidation state. Those skilled in the art will recognize that such additional ligands can include monovalent ligands (such as the groups defined above for substituents X), or a two-electron donor ligands such as $NR_3$, $PR_3$, CO, $H_2O$, or other such donor ligands. Thus, for example, a rhodium based catalyst 1 could include an additional Cl ligand in order to satisfy the additional coordination site (which will be in the axial position of a square pyramidal type geometry) and to yield an oxidation state of 3 for the Rh center.

In embodiments, substituents X can be chosen to change the acidity of Lewis acid A, to provide steric bulk, or to influence control of stereoselectivity or monomer preference. Linking groups Y can be chosen to vary the acidity of Lewis acid A, the electronic properties of electron donating groups E, the length for monomer polar group donation to Lewis acid A, or steric bulk. Substituents Z can be selected to change solubility, steric interactions with substrate or growing polymer or to fine tune electronic effects. The inclusion of chiral linking groups Y, or the connection of one or more of substituents X in a ring structure with one or more of linking groups Y or substituents Z, can be used to obtain isotactic or syndiotactic polymers.

In another embodiment, a class of active ILA-SS-POPC species can be represented by the general formula 2:

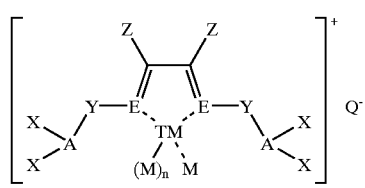

where TM, E, X, Y, Z and Q are defined as described above, M is one or more polymerizable olefinic monomers, and n is an integer greater than or equal to one, such that $(M)_n$ is polymer derived from one or more olefinic monomer subunits, which may be the same (e.g., a homopolymer) or different (e.g., a copolymer). Optionally, compounds according to formula 2 can also include one or more additional ligands as described above to satisfy additional coordination sites of metal center TM, and/or to adjust the metal's oxidation state.

Preferably, monomers M include one or more polar functionalized α-olefins, such as vinyl chloride, vinyl acetate, acrylonitrile, methyl acrylate, methyl methacrylate, other acrylates, methyl vinyl ketone, chloroprene. Optionally, in some embodiments, polymer $(M)_n$ is a copolymer that also includes one or more non-polar α-olefinic monomers, such as non-polar monomers such as ethylene, propylene, butene, other alkenes, styrene, butadiene, norbornene. Those skilled in the art will readily recognize other polar and non-polar α-olefins as candidates for polymerization using catalysts 1 and 2.

A general method 100 for identifying new catalysts, including both catalysts that improve upon current systems and catalysts that can perform new processes, is illustrated in FIG. 1. In preferred implementations, these methods use accurate quantum mechanics (as described below), including the effects of solvent polarization, to determine the structure, energetics, transition states, barrier heights (activation energies), and rates (using vibrational frequencies at both the stable structures and transition states. Preferably, the methods include calculations based on a catalyst template incorporating structural information based on actual catalyst structures (e.g., using the full ligands X, Y, Z, and L for catalysts of formula 1). To simplify the calculations (and thereby increase the number of cases that can be considered, for example), however, the catalyst template can incorporate structural information that approximates one or more of the catalyst's structural components by using simpler components of similar chemical character (e.g. CH3 in place of Ph or mesityl). Alternatively, particular structural components can be described with a less accurate but faster means of calculation (e.g. using a force field (denoted as QM/MM) or a semiempirical QM method (e.g. tight binding, extended Huckel, MINDO/MNDO, AM1, etc). After suitable candidates are identified using the simpler system, the best cases can be considered using the full catalyst structure.

Using mechanistic information (either known or computationally determined), one can identify the critical steps requiring a new design to the catalyst, and these computational methods can then be used to quickly scan a library of potential modifications (e.g., changes of A, E, TM, X, Y, Z, L in 1, or solvent or counter ion) to determine which modifications may be suitable for each particular critical step. These results can then be combined to determine the intersections of cases satisfying all conditions. If these steps yield no suitable candidates, then the backbone of the catalyst (e.g., E=CZ—CZ=E in 1) can be modified to change the mechanism to accommodate the steps that did not work with 1.

Thus, the method begins with the determination of a catalytic mechanism and potential energy surface for the process in question (step 110). In this step, ab initio quantum chemistry techniques such as density functional theory (DFT) are used to calculate the optimum structure (geometry) and energy and to find structures and energies for key intermediates and transition states. Optionally, these techniques can be extended to include mixed quantum mechanics/molecular mechanics (QM/MM) or mixed ab initio QM/semiempirical QM methods. A mechanism and potential energy surface for the catalytic cycle are elicited from the relevant structures and energies by considering all plausible reactions from each intermediate.

Next, catalytic bottlenecks are identified (step 120). In this step, a mechanism and potential energy surface can be determined for one or more typical known catalysts of the process. Alternatively, general knowledge and understanding of the processes might be used to hypothesize likely mechanisms. The potential energy surface from the QM is examined to identify points where difficulties might be manifested including, for example, points where the catalyst is too slow, leads to an undesired product, or becomes poisoned (e.g. because intermediates are overly stable and/or the transition states structures to the desired products are too high in energy). Identification of the most significant difficulties provides the basis for high throughput screening tests discussed below.

Starting from this data for known catalysts, one or more viable new catalysts are formulated (step 130) by introducing variations (usually relatively major) and determining the mechanism and potential energy surface for the varied systems. Suitable variations can include changes in the identity of the metal, ligand structure, solvent, co-catalyst, temperature, pressure, and other conditions (such as flow, ultrasonics, and light). Such screening tests can be used to narrow the field of good candidates by eliminating systems that fail the test(s), thereby avoiding the need to calculate the full potential energy surface for each candidate system. Such screening tests can involve, for example, the calculation of only a small subset of the key intermediates and/or transition states, the relative energies of which can be compared to some predetermined requirement. For example, if it has been ascertained to be a necessary (but not necessarily sufficient) condition for one intermediate structure to be lower in energy than another intermediate in order for a catalyst to be viable, then these two structures can be calculated for each potential system, and cases with favorable comparisons can then be subjected to more stringent tests or to calculation of the full potential energy surface. Preferably, results are analyzed to identify trends and make observations that are used as the bases of new variations. The process of introducing variations, screening the candidates and analyzing results to identify new variations can be repeated until promising catalysts are identified. This process can also be aided by appropriate experimental tests to validate the structures, energetics, rates, and/or products predicted.

Once promising catalyst systems are identified, those systems can be refined (step 140) using a variety of techniques. Sterically bulky groups can added and/or other relatively minor variations made to "tweak" the catalysts to find optimal systems. Fine tuning can also be done to find optimal catalysts to control the structure of the catalytic products—for example, for polymerization of polar monomers, fine tuning can lead to catalysts that yield highly isotactic or highly syndiotactic polymers and/or control how monomers are incorporated into copolymers. Finally, QM/MM methodology can be used for large systems, especially those that include large sterically bulky groups.

Method 100 was used to identify the class of ILA-SS-POPC catalysts 1 and 2 for polymerization of polar olefins as follows. Calculations were carried out using the hybrid B3LYP flavor of density functional theory (DFT) (which includes a generalized gradient approximation and some exact exchange in additional to well tested exchange-correlation functionals) with accurate basis sets (e.g. LACV3/Jaguar) and effective core potentials (or all electron) including accurate descriptions of solvent polarization (e.g. Poisson-Boltzmann with realistic molecular surfaces). These calculations can be accomplished using commercial software such as the Jaguar (v4.0) program, available from Schrödinger, Inc., of Portland, Oregon and New York City. Calculations were performed on five different computer systems: IBM p640/B80 computers, each with 4375 MHz POWER3-II processors running an AIX 4.3.3 operating system; Dell PowerEdge 2450 computers, each with 2 Intel Pentium III 866 MHz processors, running a Red Hat Linux version 6.2 operating system; Dell Precision 410MT workstations, each with 2 Intel Pentium II 450 MHz processors, running a Red Hat Linux version 5.2 operating system; and Dell Precision 410MT workstations, each with 2 Intel Pentium II 600 MHz processors running Red Hat Linux version 5.2; and Dell PowerEdge 6300 machines, each with 4 Intel Pentium III Xeon 550 MHz processors running Red Hat Linux version 6.1. Although each system included machines having multiple processors, the Jaguar calculations discussed here need not be run in parallel mode (i.e., they can be run on only a single processor).

B3LYP includes non-local gradient corrections to the Slater local exchange functional (see J. Slater, *Quantum Theory of Molecules and Solids, Vol. 4: The Self-Consistent Field for Molecules and Solids*, McGraw-Hill: New York, 1974) and some exact Hartree-Fock exchange. Parameters known as Becke 3 were used along with the Becke non-local gradient correction, the Vosko-Wilk-Nusair exchange functional, and the Lee-Yang-Parr local and non-local correlation functional, as described in A. Becke, *J. Chem. Phys.* 1993, 98, 5468; A. Becke, *Phys. Rev. A* 1988, 38, 3098; S. Vosko, et al., *Can. J. Phys.* 1980, 58, 1200; C. Lee, et al., *Phys. Rev. B* 1988, 37, 785. Spin-restricted singlet states were solved for without spatial symmetry constraints. All energies were reported as internal energies (ΔE) without zero point energy, finite temperature enthalpy, or entropy corrections.

The basis set used for Pd, Ni, and Sc was the Hay and Wadt 18-electron relativistic effective-core potential, as described in P. Hay, et al., *J. Chem. Phys.* 1985, 82, 299. For all other atoms, the 6–31G* basis set was employed, except for atoms of the di-imine derivative ligand that are not directly coordinated to the transition metal atom (Pd or Ni), for which the 6–31G basis set was used.

All vacuum structures were geometry optimized, corresponding either to minima (zero negative eigenvalues for the Hessian) or transition state structures (one negative Hessian eigenvalue). Transition structure searches were guided by a quadratic synchronous transit method, employing a reactant and a product geometry to aid in the search along a reaction coordinate.

Calculations for results that include solvation use the Poisson-Boltzmann continuum model (PBF) (D. Tannor, et al., i J. Am. Chem. Soc. 1994, 116, 11875; B. Marten, et al., *J. Chem. Phys.* 1996, 100, 11775; C. Cortis, et al., *J. Comput. Chem.* 1997, 18, 1570) within the Jaguar program. Solvation effects for the new catalysts of Example 2 are incorporated through single-point energy calculations with the vacuum-optimized structures, while the vacuum structures were fully re-optimized in solution for the known Pd di-imine catalysts described in Example 1. Parameters representative of a methylene chloride solvent (dielectric constant of $\epsilon=10$ and a probe radius of 2.33 Å) were used. D. Lide, *CRC Handbook of Chemistry and Physics;* 74th ed.; CRC Press: Boca Raton, Fla., 1993–94. Dielectric constants for 20° C. were used and rounded to the nearest integer. Probe radius $r_{solv}$ was calculated from $$r^3 = \frac{3m\Delta}{4\pi\rho}(10^{24} \text{ Å}^3/\text{cm}^3),$$

where m is the molecular mass obtained by dividing the molecular weight in g/mol by Avogadro's number, Δ is the packing density (assumed to be 0.5 in lack of detailed knowledge of liquid structure), and p is the density in g/cm³ at 20° C.

Figure 2:
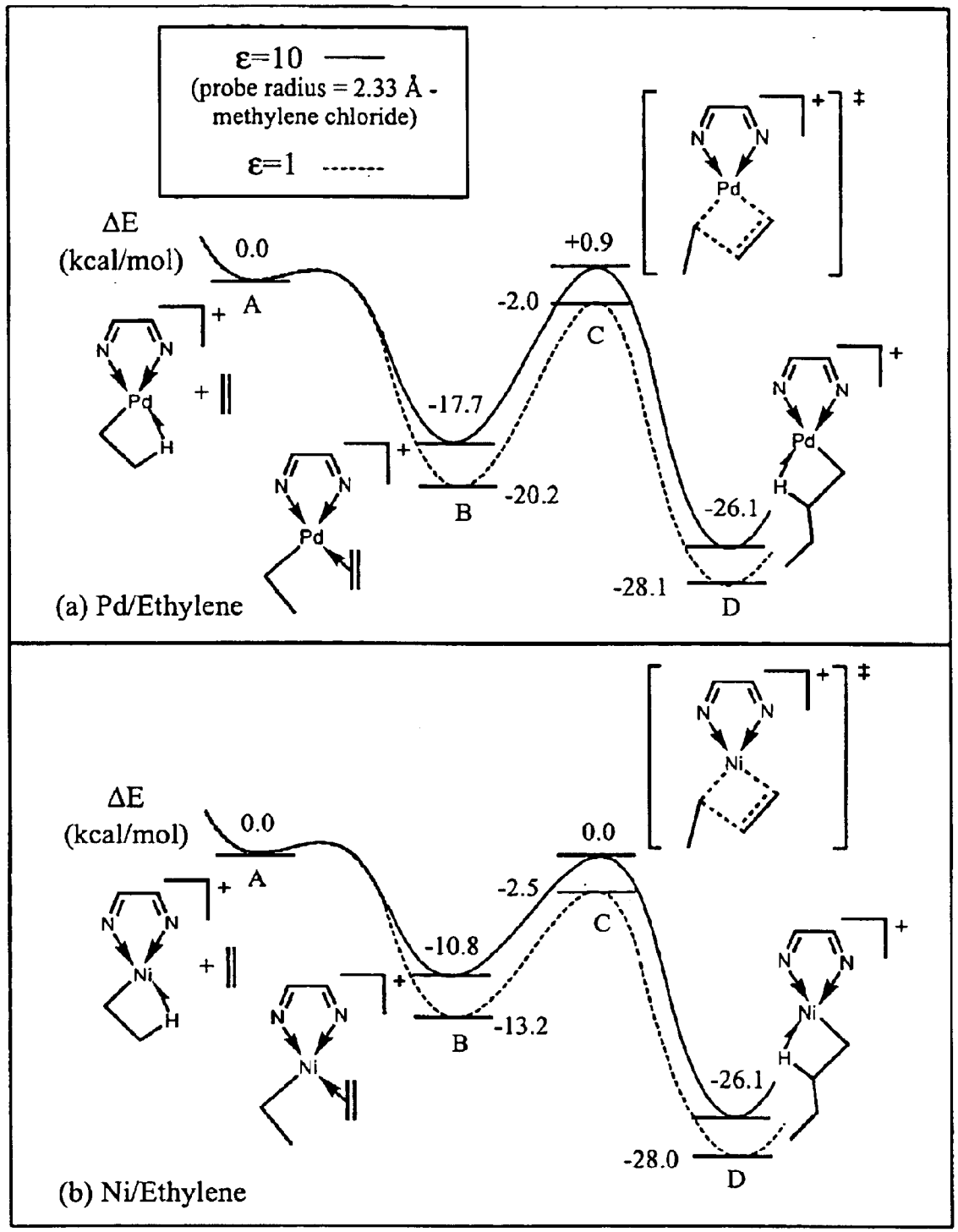
FIG. 2 is a potential energy diagram for the catalysis of ethylene polymerization by nickel and palladium di-imine model catalysts. Solvent is shown to decrease the stability of the adduct B and increases the transition state energy of C by about 3 kcal/mol This demonstrates the need for including solvation effects, which are represented by solid curves (with a dielectric constant and probe radius representative of methylene chloride solvent), while dotted curves are gas-phase results. This diagram and all others discussed below use standard notation in which hydrogen atoms are not shown. Thus, the ligand here is actually HN=CH—CH=NH. The energetics from these calculations should be indicative (within a few kcal/mol) of those for a catalyst in which the H is replaced with larger groups such as Ph or mesityl. The methods used in these calculations are expected to yield relative energies for the stable minima to about 3 kcal/mol and for the transition states to about 6 kcal/mol. For this and all other figures the transition states have been check by calculating the vibrational frequencies from the Hessian and ensuring that there is one imaginary frequency (one negative eigenvalue from the Hessian).

The Pd di-imine catalyst system of Brookhart (L. Johnson, et al., *J. Am. Chem. Soc.* 1995, 117, 6414) was used as a representative example of a late transition metal polymerization catalyst. The mechanism and potential energy surface for a model system based on these catalysts (with bulky sidegroups replaced by hydrogen atoms) were calculated, and are illustrated in FIG. 2 for the catalysis of ethylene polymerization by nickel and palladium di-imine complexes.

These calculations agree well with experiment, and are similar to results obtained by Morokuma and co-workers and Ziegler and co-workers. See D. Musaev, et al., *Organometallics* 1997, 16, 1933; D. Musaev, et al., *J. Am. Chem. Soc.* 1997, 119, 367; L. Deng, et al., *J. Am. Chem. Soc.* 1997, 119, 1094. As these are highly active catalysts for ethylene polymerization, their potential energy curves are useful benchmarks for comparison with the results for ILA-SS-POPC catalysts 1 and 2 presented below.

Figure 3:
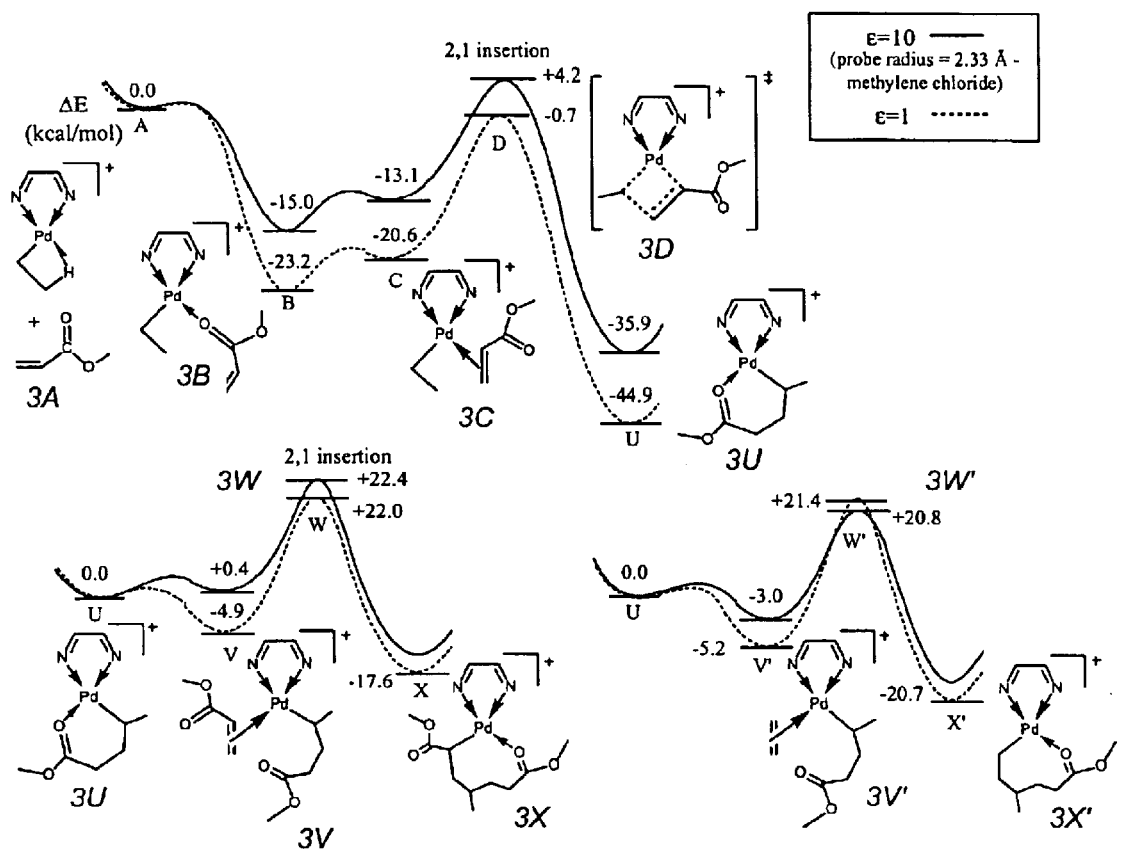
FIGS. 3–6 are potential energy diagrams for Pd di-imine catalyst with methyl acrylate, vinyl acetate, vinyl chloride, and acrylonitrile, respectively.
Figure 4:
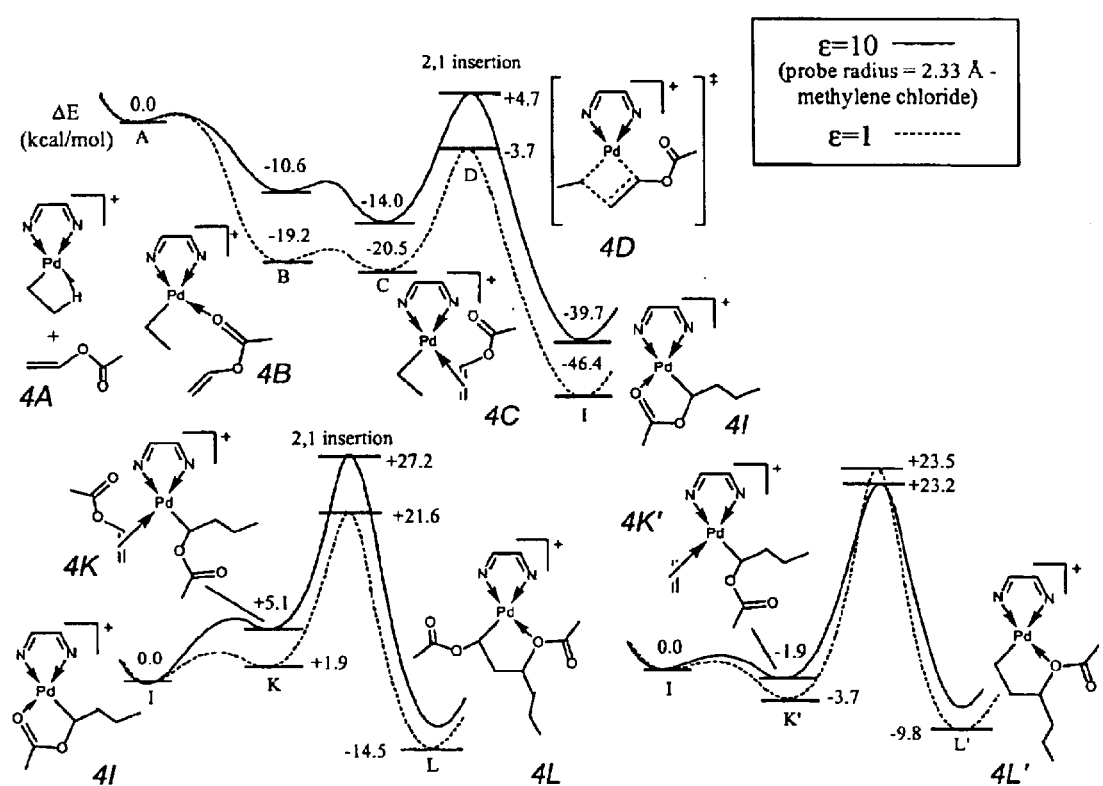
Figure 5:
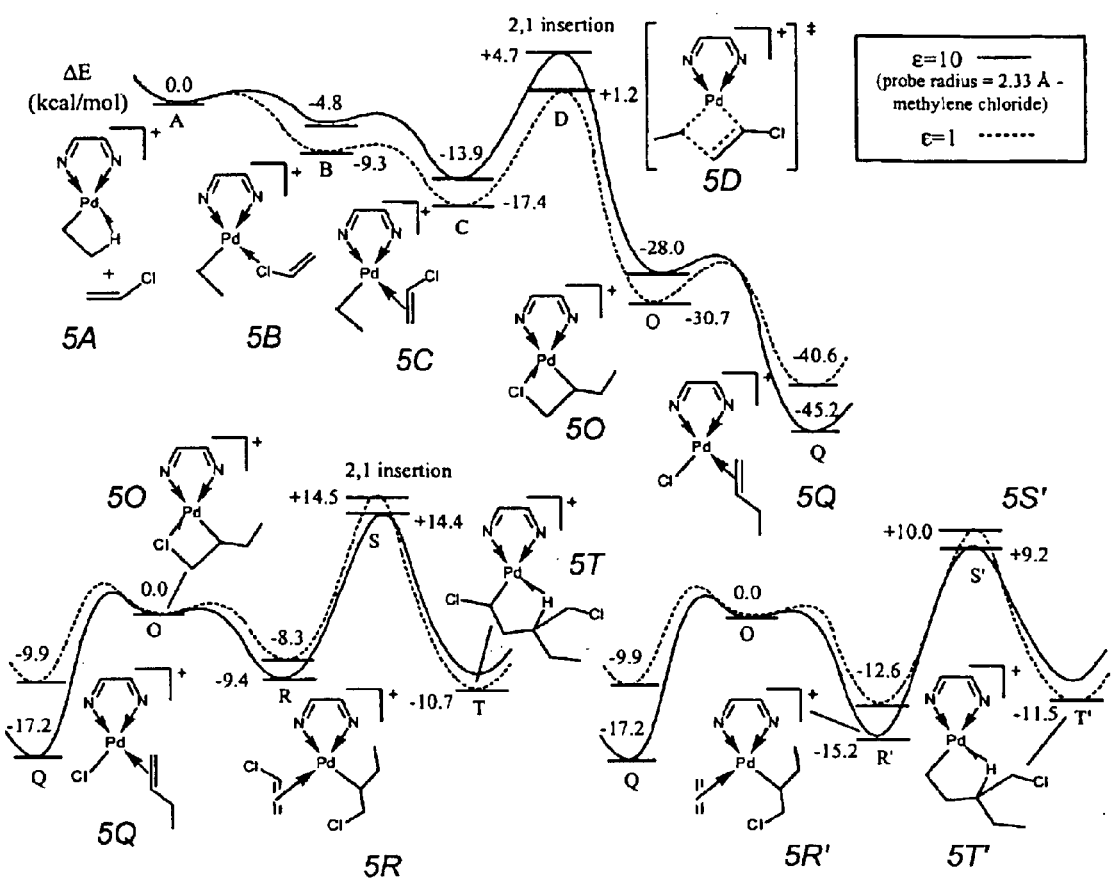
Figure 6:
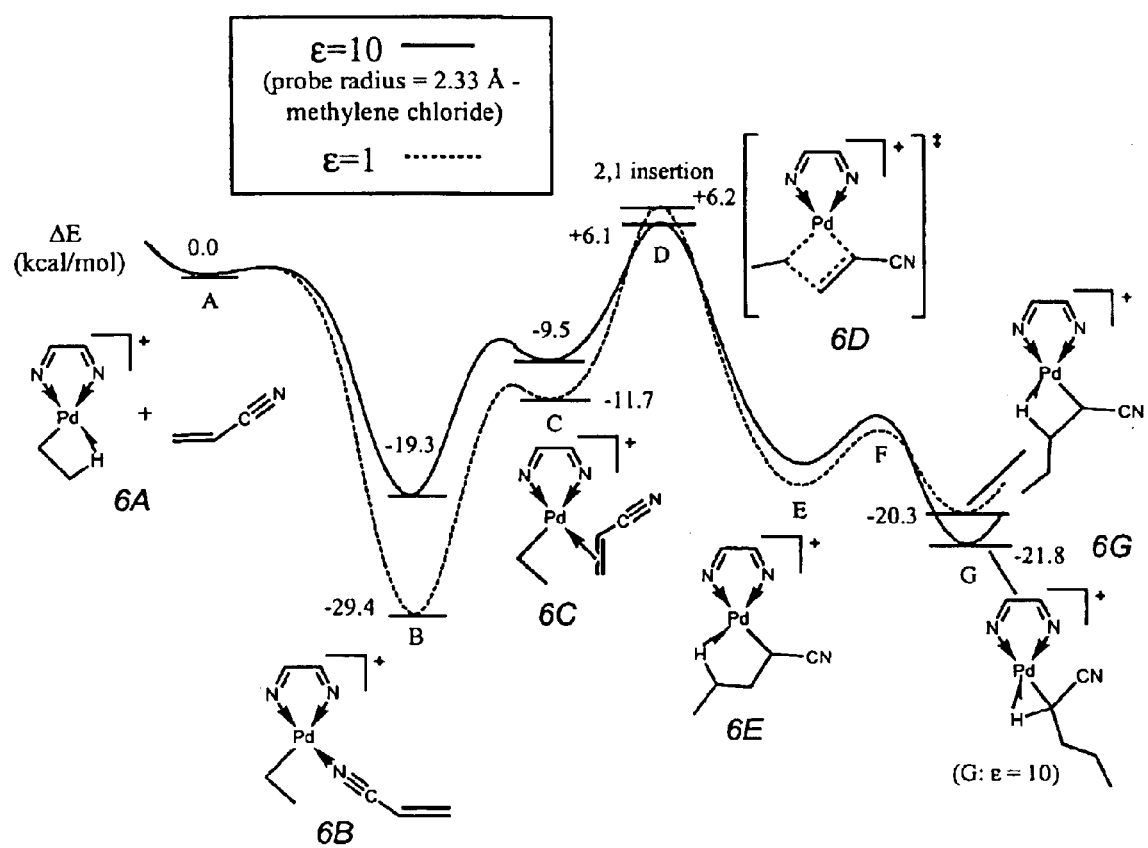

To identify the bottlenecks in the use of these catalysts with polar monomers, the analogous potential energy surfaces were calculated for the polymerization of methyl acrylate, vinyl acetate, vinyl chloride, and acrylonitrile, as illustrated in FIGS. 3, 4, 5 and 6, respectively. Examination of these surfaces reveals that methyl acrylate and vinyl acetate insertions lead to products with strong interactions between the carbonyl oxygen and metal, as shown in FIGS. 3 and 4. FIG. 3 suggests that the Pd di-imine catalyst can form co-polymers of ethylene and methyl acrylate, but that methyl acrylate incorporation will be slow and limited to the placement at chain branch ends, consistent with findings by Brookhart and co-workers. See S. Mecking, et al., *J. Am. Chem. Soc.* 1998, 120, 888. Moreover, as FIG. 4 illustrates, barriers to subsequent insertions are calculated to be even larger after vinyl acetate insertion, thus predicting that the catalyst would become trapped in this state. Referring to FIG. 5, insertion of vinyl chloride is predicted to lead to a product in which the chloride prefers to dissociate onto the metal, thus poisoning the catalyst. And finally, as shown in FIG. 6, acrylonitrile is predicted to form such a strong σ-complex that no further insertions can occur. For each of these systems, the calculations suggest that polar olefins often form weaker π-complexes, and insertion barriers are often larger than for non-polar olefins. Each of these conclusions is consistent with experimental observations. Thus, these calculations reveal that, with the limited exception of copolymers of ethylene and methyl acrylate, for these known catalysts the polar end of a polar monomer inserted into the polymer chain binds so strongly to the metal (or even dissociates onto the metal) that barriers to subsequent monomer insertion are just too large.

Next, the model Pd di-imine system was varied for each of the four polar monomers (vinyl chloride (VC), vinyl acetate (VA), methyl acrylate (MA) and acrylonitrile (ACN) by replacing palladium with other late transition metals (here, nickel) and/or by varying the ligand structure to generate the potential energy surfaces shown in FIGS. 7–28. Where appropriate, screening tests were used, such as the comparison of energies for the dissociated chloride species with that of the β-agostic chloride structure (structure 5Q vs. structure 5O in FIG. 5) in the vinyl chloride polymerizations to rule out candidates where the dissociated chloride species was overly stable relative to the β-agostic chloride structure.

These calculations led to the observation that polar groups (such as the Cl of vinyl chloride) of incoming monomers and monomers incorporated into polymer chains showed affinity for acidic hydrogens in the ligand framework. This suggested that Lewis acids could be beneficially incorporated in the ligand structure to interact with the polar groups and thereby prevent catalyst deactivation; the resulting variations including Lewis acids led to the identification of ILA-SS-POPC catalysts 1 and 2 presented here. Those skilled in the art will recognize that further variation (such as the addition of bulky groups to the Lewis acid substituents) could be readily employed to provide additional refinement of the catalysts identified here.

For these calculations, optimizations of minimum energy and transition state structures comprising only the chain propagation step of the catalytic cycle were performed. It is assumed that activation (e.g., from a neutral dichloride species) to the cationic complex is possible. Because chain propagation must occur without being trapped in a low energy poisoning state for successful polymerization of polar monomers, and because chain termination/transfer steps will be highly dependent upon the presence of bulky sidegroups as part of the catalytic complexes, chain termination/transfer pathways are ignored at the present time. Bulky sidegroups can be incorporated at a later time during catalyst refinement and is unnecessary in the generation of basic potential energy diagrams. The exceptions to the chain propagation modeling done here are for catalyst VC1 and VA1 (Tables 1 and 2, below), where rearrangement pathways leading to a poisoning states are explored to show that they would not generally occur in these catalysts with vinyl chloride and vinyl acetate as respective substrates.

For the modeling of the chain propagation step, the calculations confirm that polymerization proceeds via the *Cossee-Arlman mechanism*, (P. Cossee, *J. Catal.* 1964, 3, 80; E. Arlman, *J. Catal.* 1964, 3, 89; E. Arlman, et al., *J. Catal.* 1964, 3, 99) as has been found to be the case by Brookhart and co-workers for ethylene polymerization by Pd and Ni di-imine catalysts. D. Tempel, et al. *J. Am. Chem. Soc.* 2000, 122, 6686. The growing polymer chain is modeled with an ethyl chain and either a —Cl, —OC(O)CH3, —CC(O)CH3, or —CN group at the ethyl α-carbon to respectively represent a just prior 2, 1-insertion of VC, VA, MA, or ACN.

Critical energies calculated for polymerization of vinyl chloride using the ten formulations VC1 to VC10 of ILA-SS-POPC catalysts 1 and 2 listed in Table 1 (where the distance $r_{A-cl}$ is between the Lewis acid A and the carbonyl O donor for structure A of each complex (e.g., structures 7A, 8A, 9A, 10A, 11A, 12A, 13A, 14A, 15A and 16A) are illustrated in FIGS. 7–16, respectively.

TABLE 1

| Catalyst | TM | A | Y | X | $r_{A-Cl}$ (Å) |
|---|---|---|---|---|---|
| VC1 | Pd | Al | O | Cl | 2.39 |
| VC2 | Pd | Al | O | F | 2.35 |
| VC3 | Pd | Al | O | CF$_3$ | 2.33 |
| VC4 | Pd | Al | S | Cl | 2.41 |
| VC5 | Pd | Sc | O | Cl | 2.58 |
| VC6 | Ni | Al | O | Cl | 2.37 |
| VC7 | Ni | Al | O | CF$_3$ | 2.30 |
| VC6 | Pd | Al | CH$_2$ | H | 2.68 |
| VC9 | Ni | Al | O | CH$_3$ | 2.55 |
| VC10 | Ni | Al | NH | CH$_3$ | 2.48 |

In FIGS. 7–16, the various important intermediates are labeled as follows (where, e.g., A refers to intermediate 7A in FIG. 7, intermediate 8A in FIG. 8, etc.):

A is the growing polymer bound to catalyst, with no monomer substrate. The growing polymer is represented by an ethyl chain with a Cl at the ethyl α-carbon.

B is the substrate (vinyl chloride) complexed to catalyst containing growing polymer. This should be significantly lower in energy (at least 10 kcal/mol) than A.

C is the transition state for inserting the monomer into the growing polymer (leading from B to D). This should be low, below about 23 kcal/mol.

D is the N+1 polymer bound to catalyst (a new version of A). This should be significantly lower than B (at least 5 kcal/mol).

Y is the β-hydride elimination of the growing polymer to yield an olefin. This should be at least 10 kcal/mol above A.

U is the form of A where the polar group on the growing polymer is bound to the metal TM rather than the Lewis acid A. This should be above A by at least 5 kcal/mol.

W is the form of U in which the polar group is not bound to the metal TM.

S is the undesired elimination product of U in which the polar is bonded directly to the metal TM.

Z, X, V, and T are the transition states from A to Y, Y to W, W to U, and U to S respectively. Note that X is the highest energy transition state.

As illustrated in FIGS. 7–16, the choice of appropriate TM, E, A, X, Y and Z give energetics that yield an excellent catalyst for vinyl chloride.

Comparison of these results to the potential energy curves obtained for chain propagation of polyethylene by Pd and Ni di-imine model catalysts in FIG. 2 shows that the Ni and Pd catalysts (with the exception of catalysts VC4 (FIG. 10), VC10 (FIG. 16), and the solution-phase curve for catalyst VC5 (FIG. 11) for vinyl chloride polymerization reported here are very similar energetically to the respective Ni and Pd catalysts in FIG. 2. Thus, catalysts of this type should be effective for producing polyvinyl chloride in the absence of a favorable pathway leading to a poisoning state.

Figure 7:
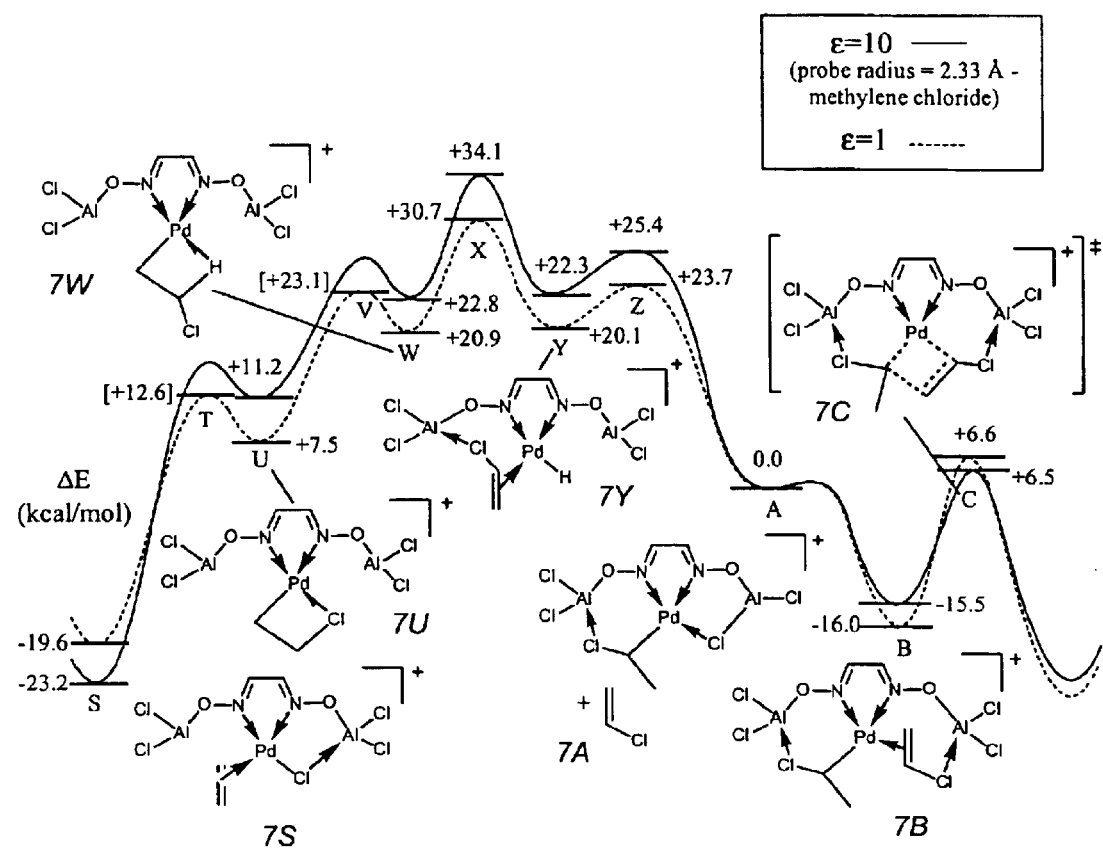
FIGS. 7–16 are potential energy diagrams for catalysts VC1, VC2, VC3, VC4, VC5, VC6, VC7, VC8, VC9, and VC10, respectively, with vinyl chloride. Solid curves include solvation effects representative of methylene chloride, and dotted curves are gas-phase results. Numbers in brackets are estimates based on analogous transitions.
Figure 8:
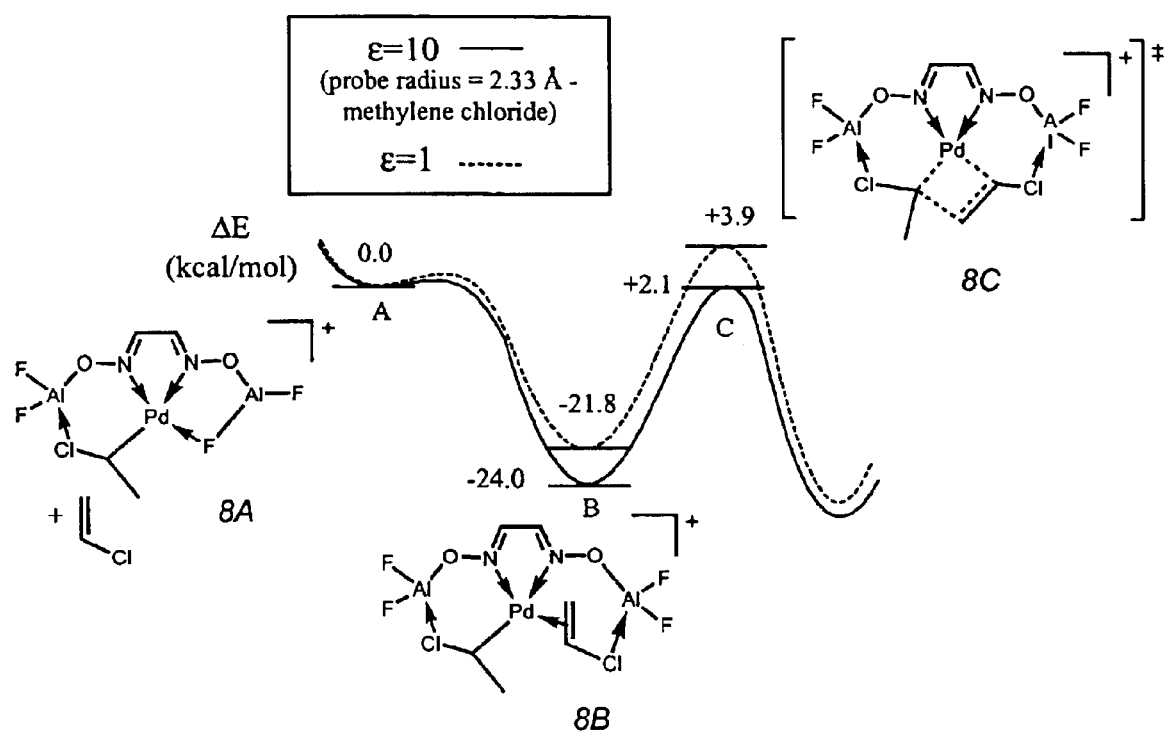
Figure 9:
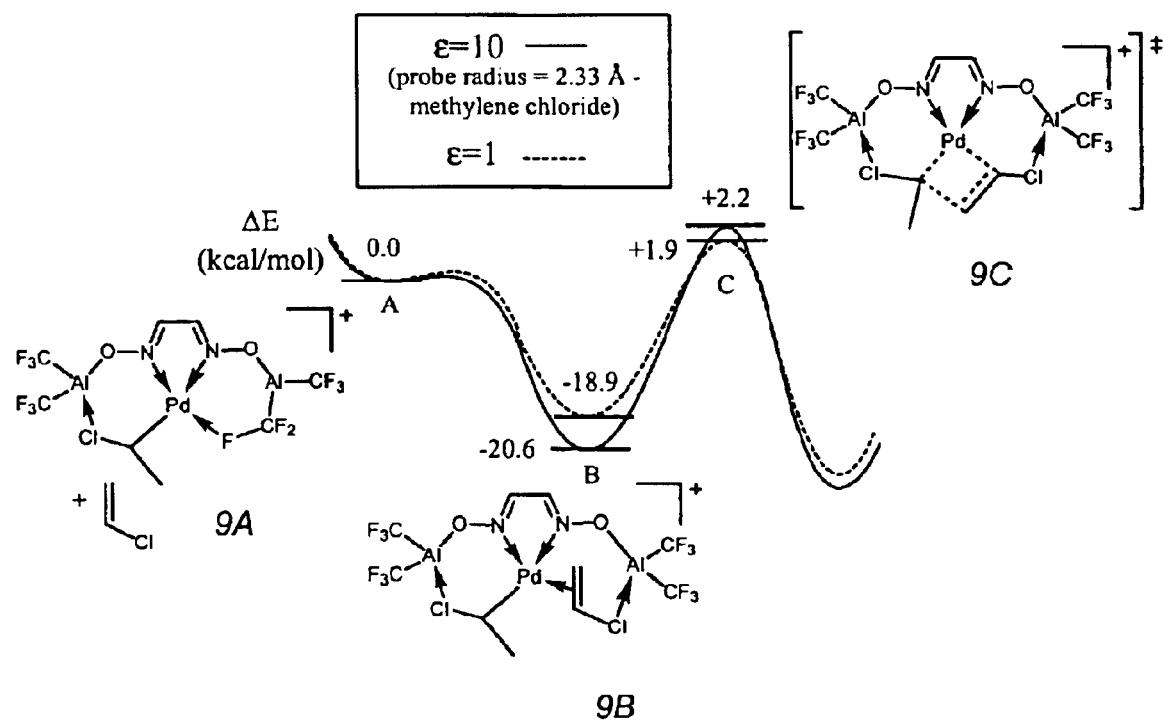
Figure 10:
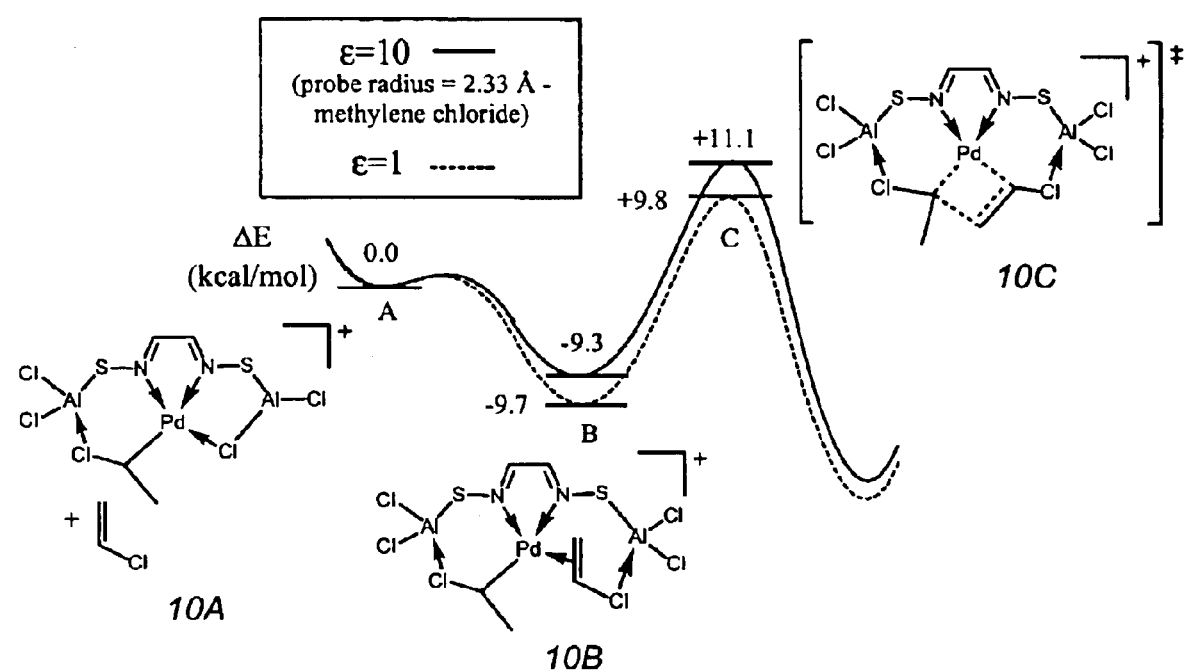
Figure 11:
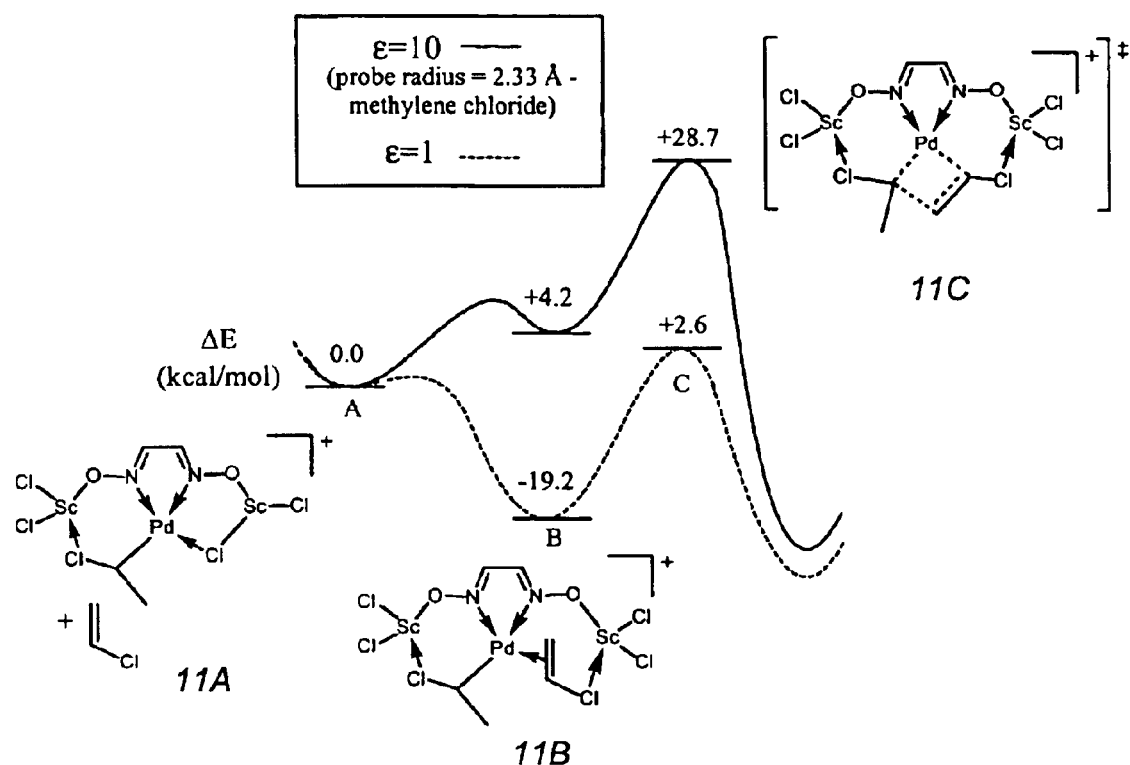
Figure 12:
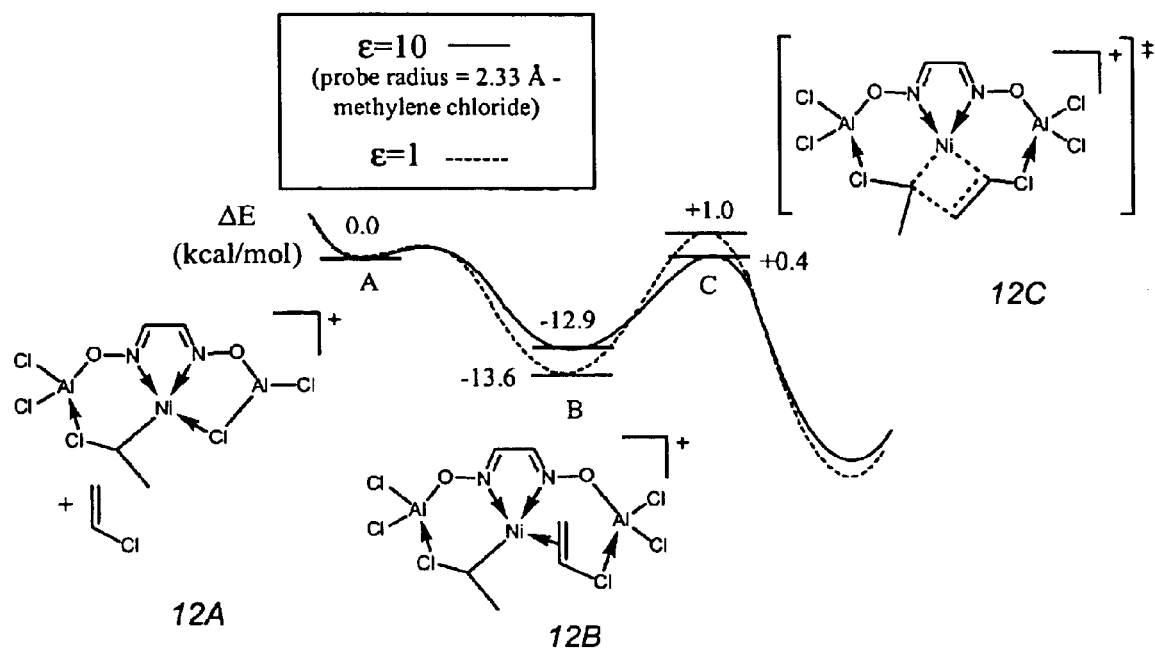
Figure 13:
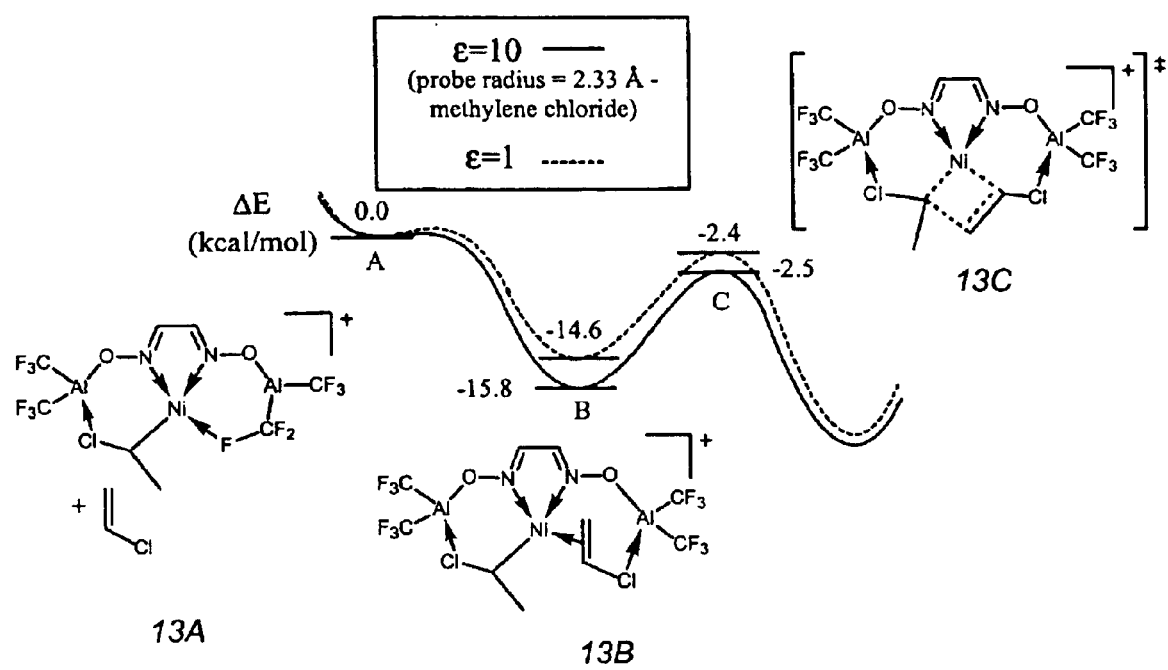

To demonstrate that poisoning will not occur, FIG. 7 also includes the potential energy diagram for the rearrangement pathway leading to a β-agostic chloride complex 7W and a subsequent exothermic dissociated chloride complex 7S. As can be seen, the overall barrier of this pathway is quite large ($E_X$–$E_A$ is about 31 kcal/mol gas-phase, 34 kcal/mol solution-phase). Even adding up to 14 kcal/mol to $E_B$ and $E_C$ to estimate free energy differences (ΔG, as opposed to the reported internal energies, ΔE; the solution-phase ΔE values will include some contributions to ΔG), the pathway leading to poisoning would still be prohibitive. In addition, it should be noted that since rearrangement should not occur, the Cl of the last added vinyl chloride monomer will remain at the α-carbon and thus the subsequent preferred 2,1 insertion will lead to good head-to-tail regioselectivity. Particular stereoselectivity should depend on the steric nature of the sidegroups.

Stronger Lewis acids (as evidenced by a shorter donor bond length from the Lewis acid A to the 1-chloroethyl Cl, $r_{A-Cl}$, in structure A; see Table 1) lead to $E_C$ having a higher energy relative to the starting point energy $E_A$. This can be important since entropic effects will raise the energies of structures B and C relative to structure A. Complexation energies ($E_B$–$E_A$) and insertion transition barriers ($E_C$–$E_B$) seem to depend on a combination of Lewis acid strength and the ability of an atom in the X substituent (e.g., Cl for catalyst VC1 (FIG. 7)) to donate to the transition metal as in structure 7A. Varying the transition metal from Pd to Ni leads to smaller complexation energies and lower insertion transition barriers, which agrees with the experimental observation that the Ni di-imine catalysts of Brookhart insert ethylene faster than those with Pd.

Figure 14:
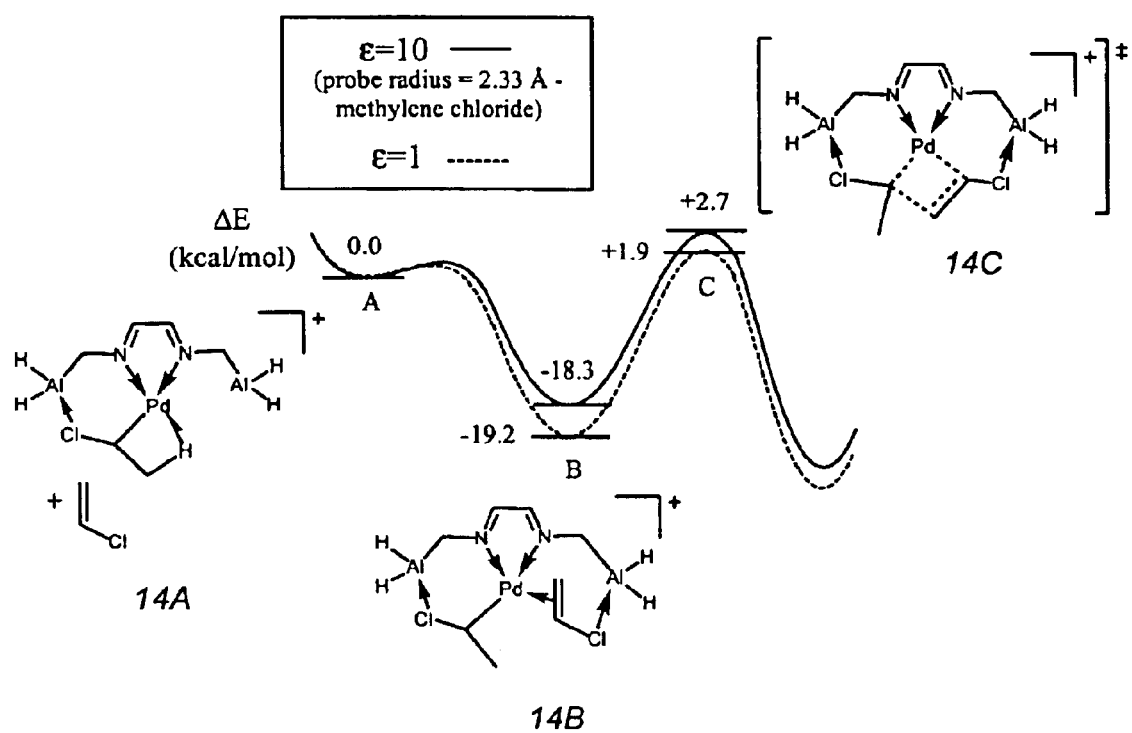
Figure 15:
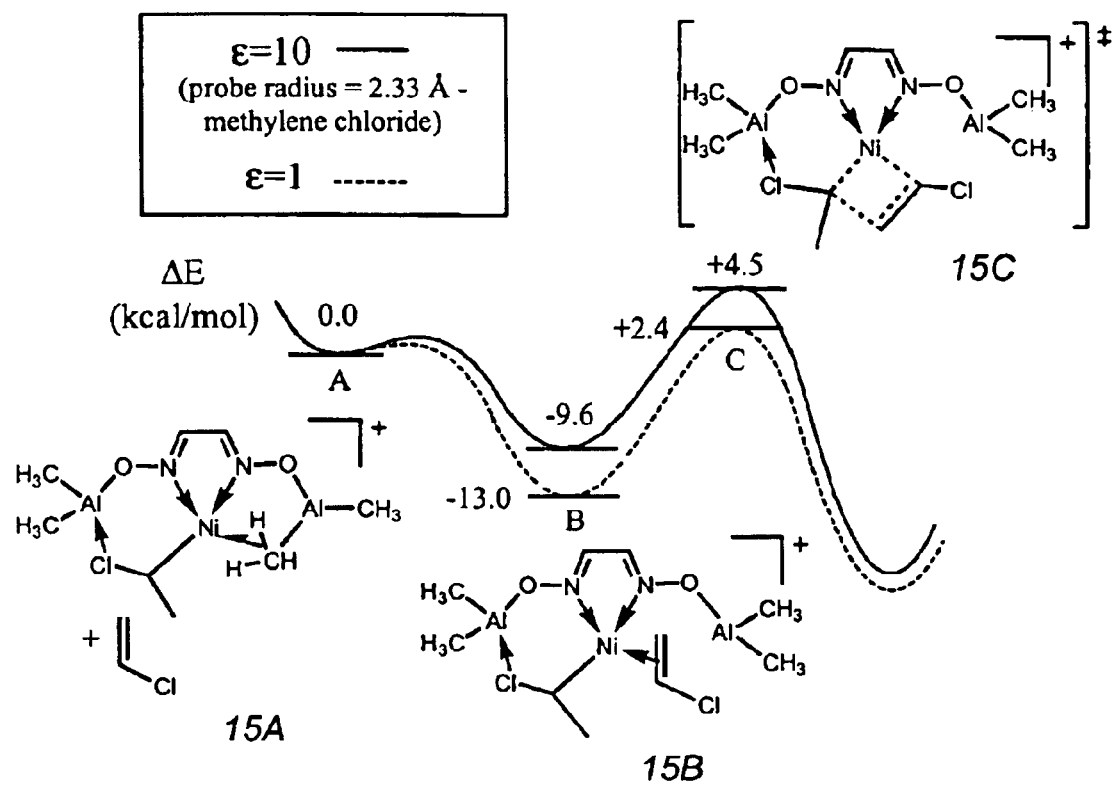
Figure 16:
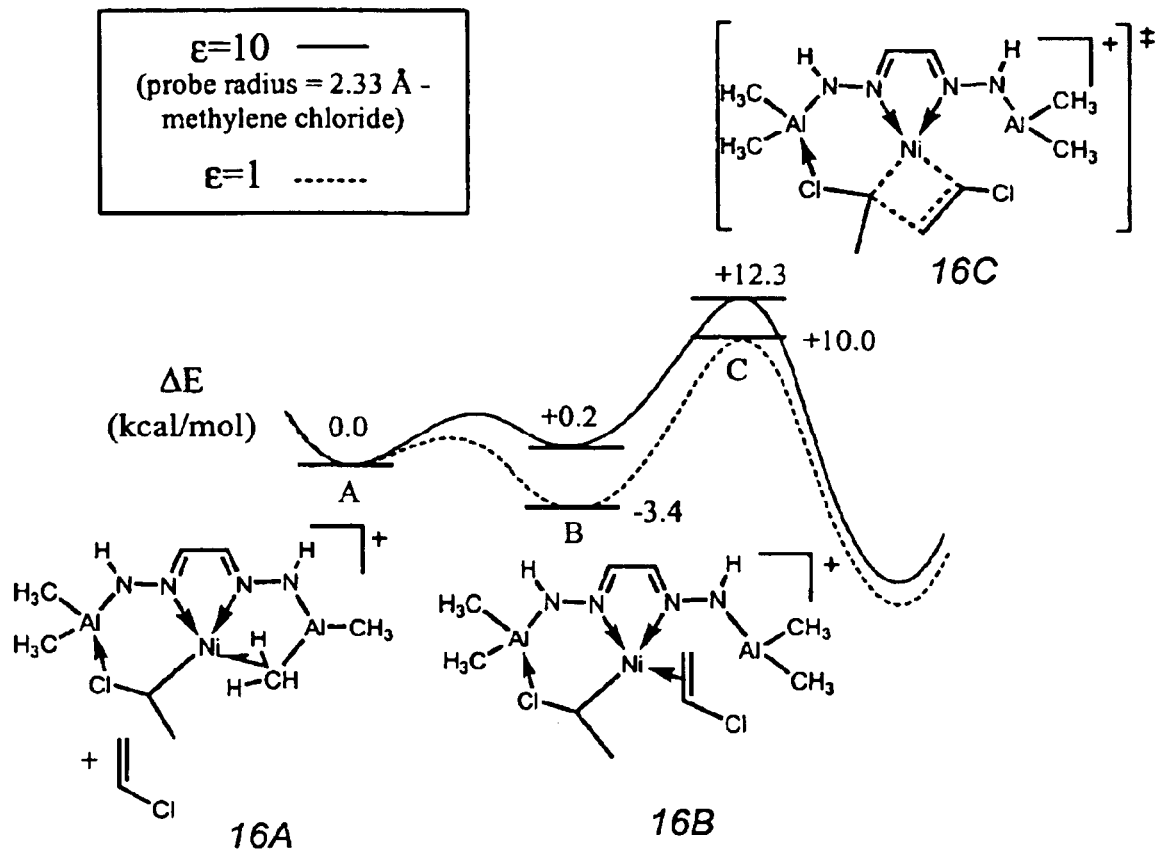

Since strong Lewis acids are desirable with vinyl chloride, these examples focus on catalysts with Y=O and X=Cl or F (highly electronegative atoms). However, weaker Lewis acids still appear to be effective, such as catalyst VC8 (FIG. 14).

These results demonstrate that Pd and Ni based complexes with di-imine ligands derivatized to include Lewis acid sidegroups are viable catalysts for vinyl chloride polymerization. The examples for which the calculated catalytic properties are presented here serve as prototypes. Table 1 indicates which special cases to consider in optimizing the catalyst to yield maximum polyvinyl chloride. Using chiral ligands in X, Y and/or Z should lead to stereoselectivity. Thus, this class of catalysts can be designed to maximize the isotactic or syndiotactic character in the resulting polymer. This should allow greatly improved properties since the current synthetic techniques (e.g., free radical polymerization) do not allow stereo control.

Similar results for polymerization of vinyl acetate calculated for the four catalyst formulations VA1, VA2, VA3, and VA4 listed in Table 2 are shown in FIGS. 17–20, respectively.

TABLE 2

| Catalyst | TM | A | Y | X | $r_{A-Cl}$ (Å) |
|---|---|---|---|---|---|
| VA1 | Pd | B | O | H | 1.66 |
| VA2 | Pd | B | O | F | 1.69 |
| VA3 | Pd | Al | O | F | 1.86 |
| VA4 | Ni | B | O | H | 1.64 |

In FIGS. 17–20, the various important intermediates are labeled as follows:

A is the growing polymer bound to catalyst, with no monomer substrate. The growing polymer is represented by an ethyl chain with an acetate group at the ethyl α-carbon.

B is the substrate (vinyl acetate) complexed to catalyst containing growing polymer. This should be significantly lower in energy (probably at least 10 kcal/mol) than A.

C is the transition state for inserting the monomer into the growing polymer (leading from B to D). This should be low, below about 23 kcal/mol.

D is the N+1 polymer bound to catalyst (a new version of A). The carbonyl O that had been donating to the Lewis acid A may now be donating to the transition metal center TM, which ideally should not yield too stable a structure for further complexation and insertion to proceed.

E is the N+1 polymer bound to catalyst with the next monomer unit complexed. This should be lower than D.

A' (if shown) is the growing polymer bound to the catalyst, like A, but now with a ring structure where the carbonyl O donates to the transition metal center TM rather than the Lewis acid A. This should higher in energy than B.

As shown in FIGS. 17–20, the choice of appropriate TM, E, A, X, Y, and Z gives energetics that yield a viable catalyst for vinyl acetate.

These results can be compared to those illustrated for ethylene polymerization by Pd and Ni di-imine model catalysts in FIG. 2. The transition barriers to insertion compare quite well, though the complexation energy to get from intermediate 20A to intermediate 20B for catalyst VA4 (with Ni) may not be large enough (and is negative when including solvation). The situation is less favorable for catalyst VA4 once another vinyl acetate unit has been added, as energy is required to go uphill from structure 20D to 20E in breaking the interaction between the carbonyl O and Ni to complex another monomer unit. For catalysts VA1–VA3 (FIGS. 17–19, respectively), it is downhill in energy to break the interaction between the carbonyl O of the previously inserted vinyl acetate and the transition metal and/or Lewis acid in order to complex the next monomer unit and get from structure D to E. Thus, the effective insertion transition barrier for these cases is not expected to increase beyond that found from the energy ($E_C$–$E_B$).

Varying the strength of the Lewis acid can greatly affect the complexation energies (as can be seen by comparing catalyst VA2, where the Lewis acid is boron, to catalyst VA3, where it is aluminum). Therefore it still may be possible to favorably change the energy profile of catalyst VA4 by modifying the catalyst, for example changing the Lewis acid from B to Al.

Figure 17:
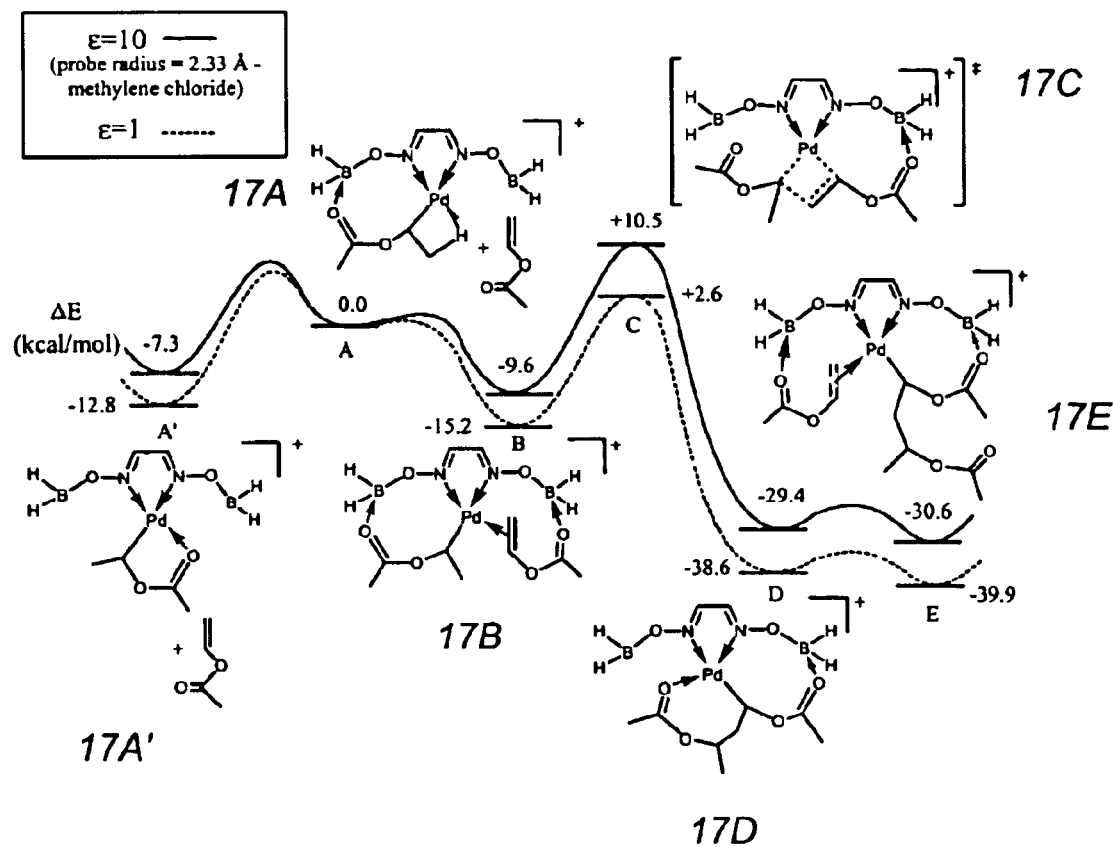
FIGS. 17–20 are potential energy diagrams for catalysts VA1, VA2, VA3, and VA4, respectively, with vinyl acetate. Solid curves include solvation effects representative of methylene chloride, and dotted curves are gas-phase results.
Figure 18:
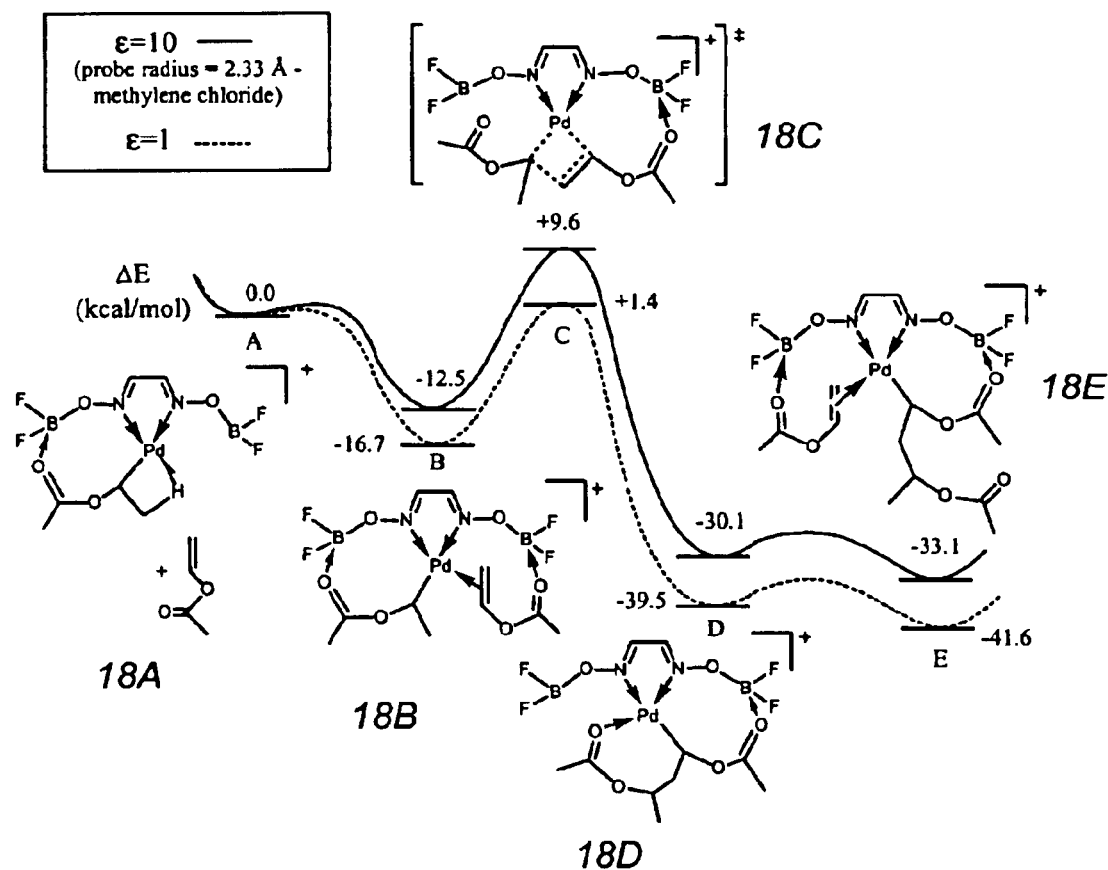
Figure 19:
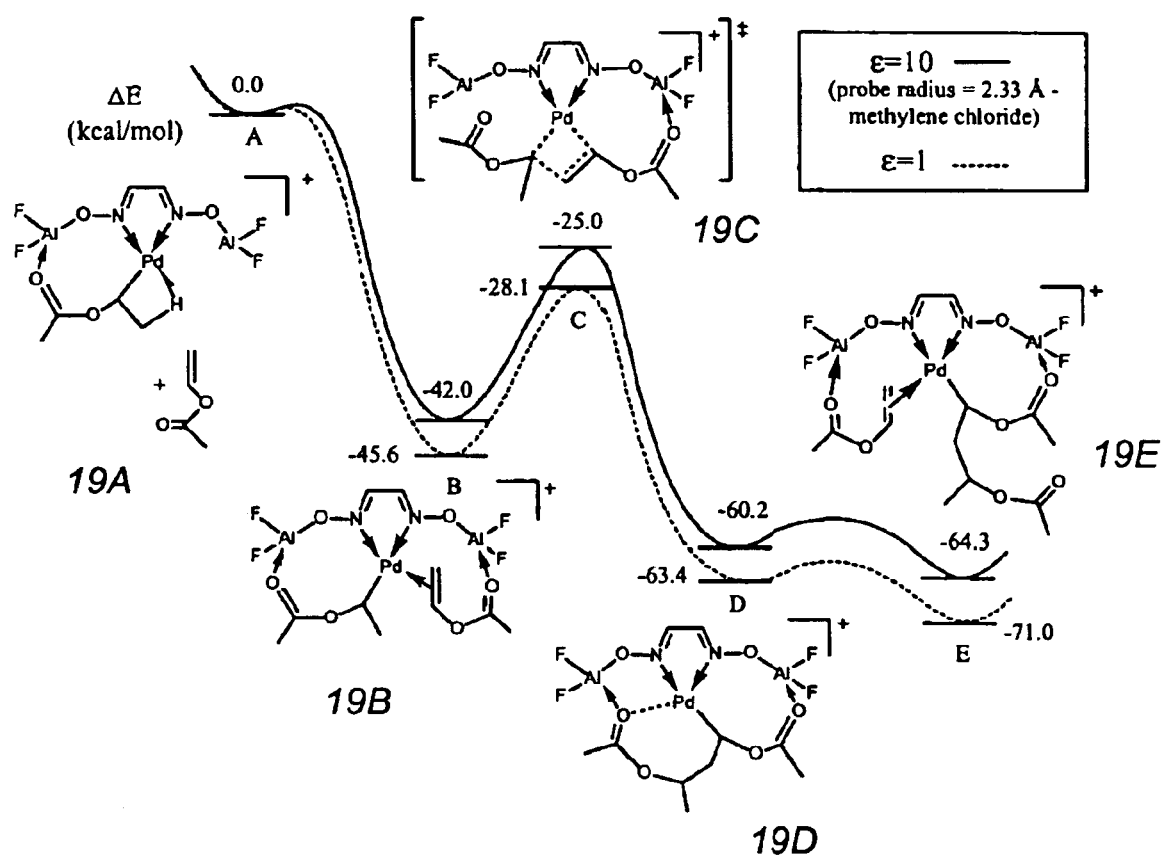
Figure 20:
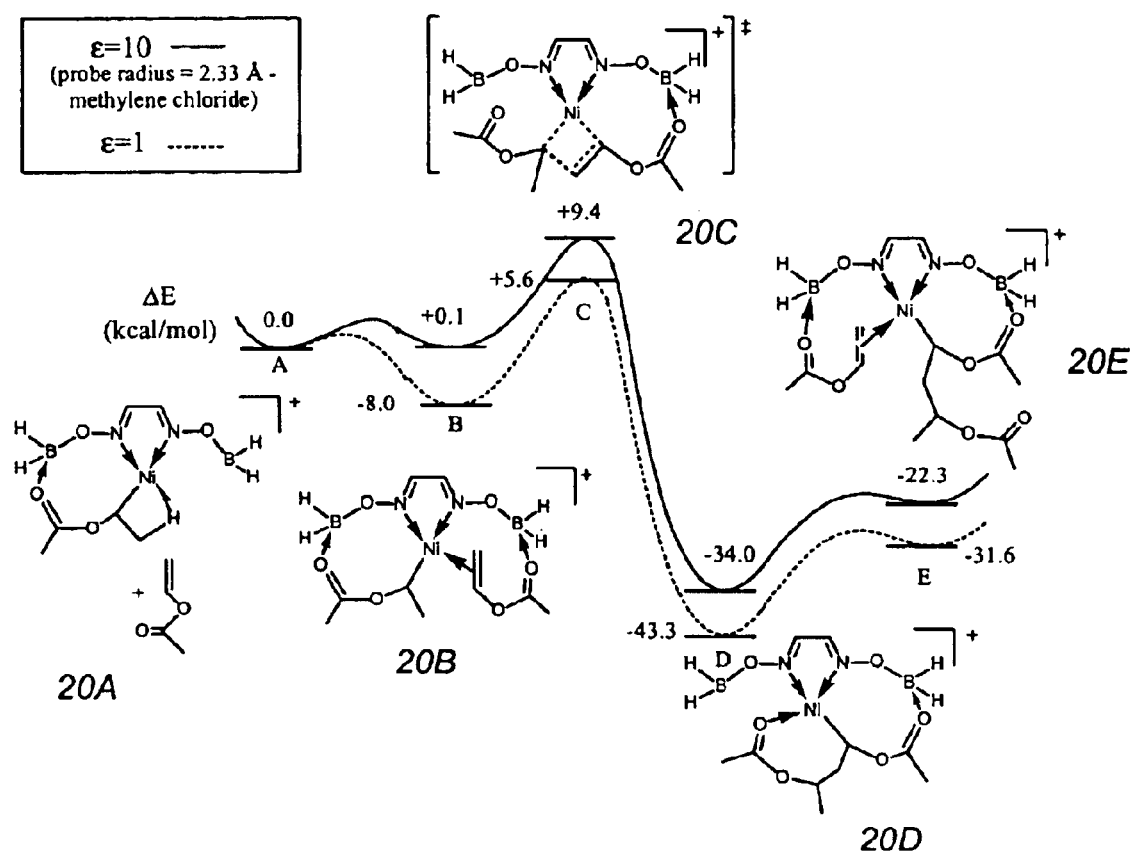
Figure 21:
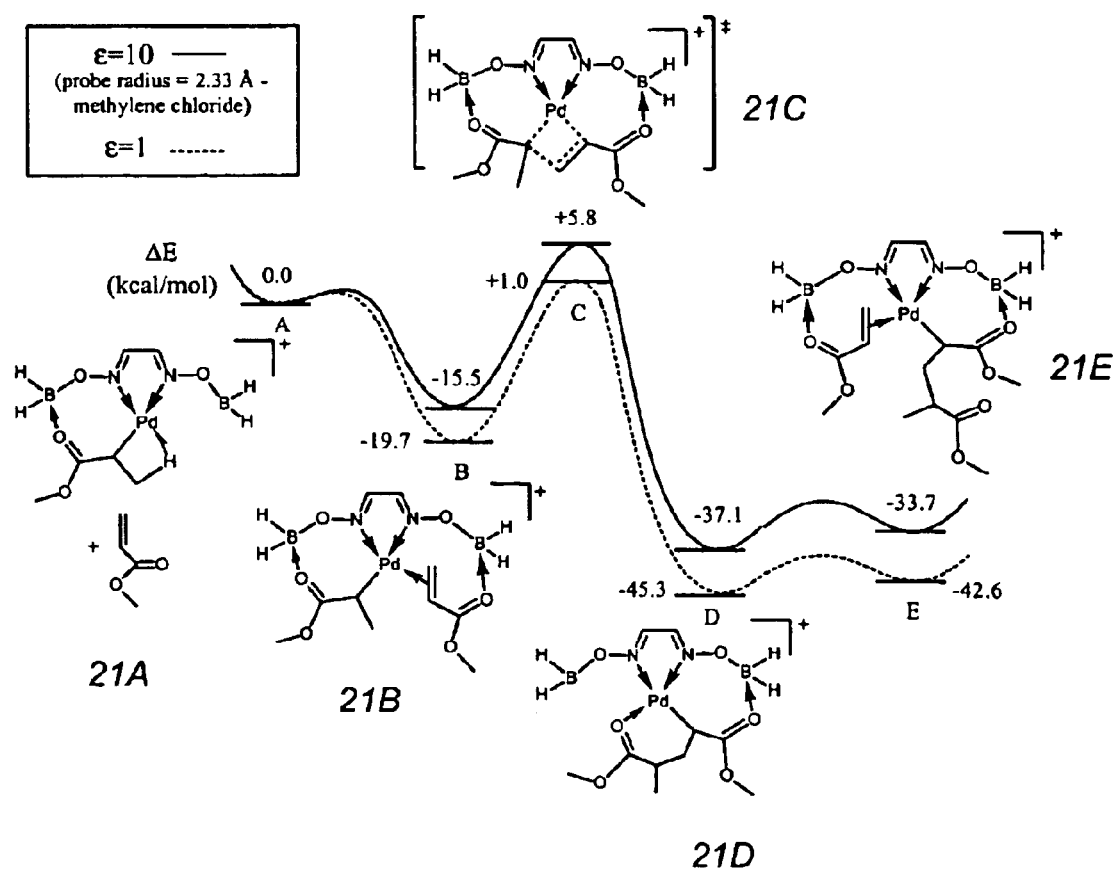
FIGS. 21–24 are potential energy diagrams for catalysts MA1, MA2, MA3, and MA4, respectively, with methyl acrylate. Solid curves include solvation effects representative of methylene chloride, and dotted curves are gas-phase results.
Figure 22:
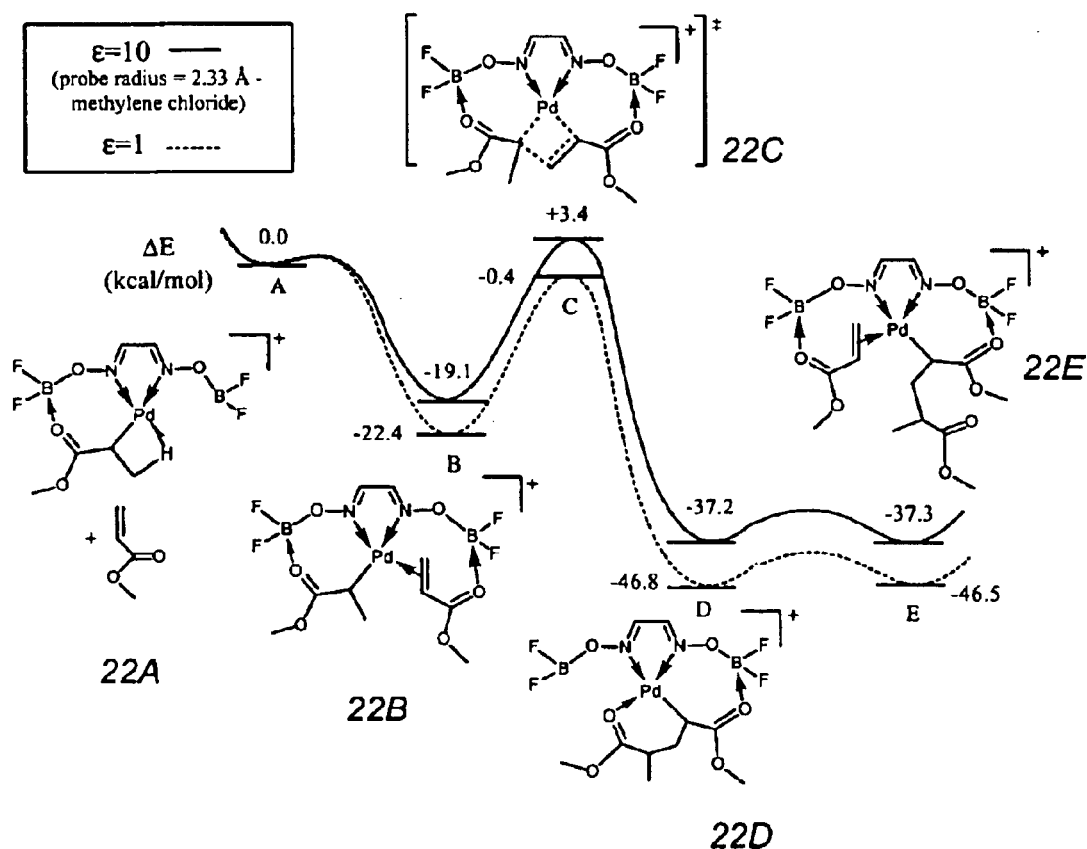
Figure 23:
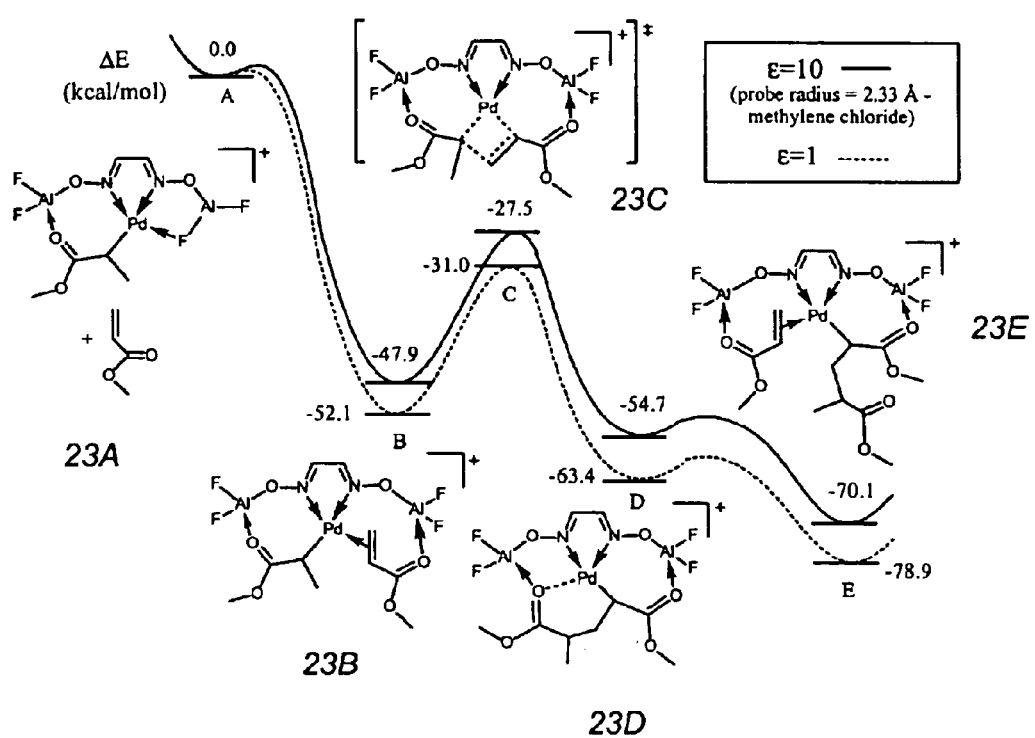
Figure 24:
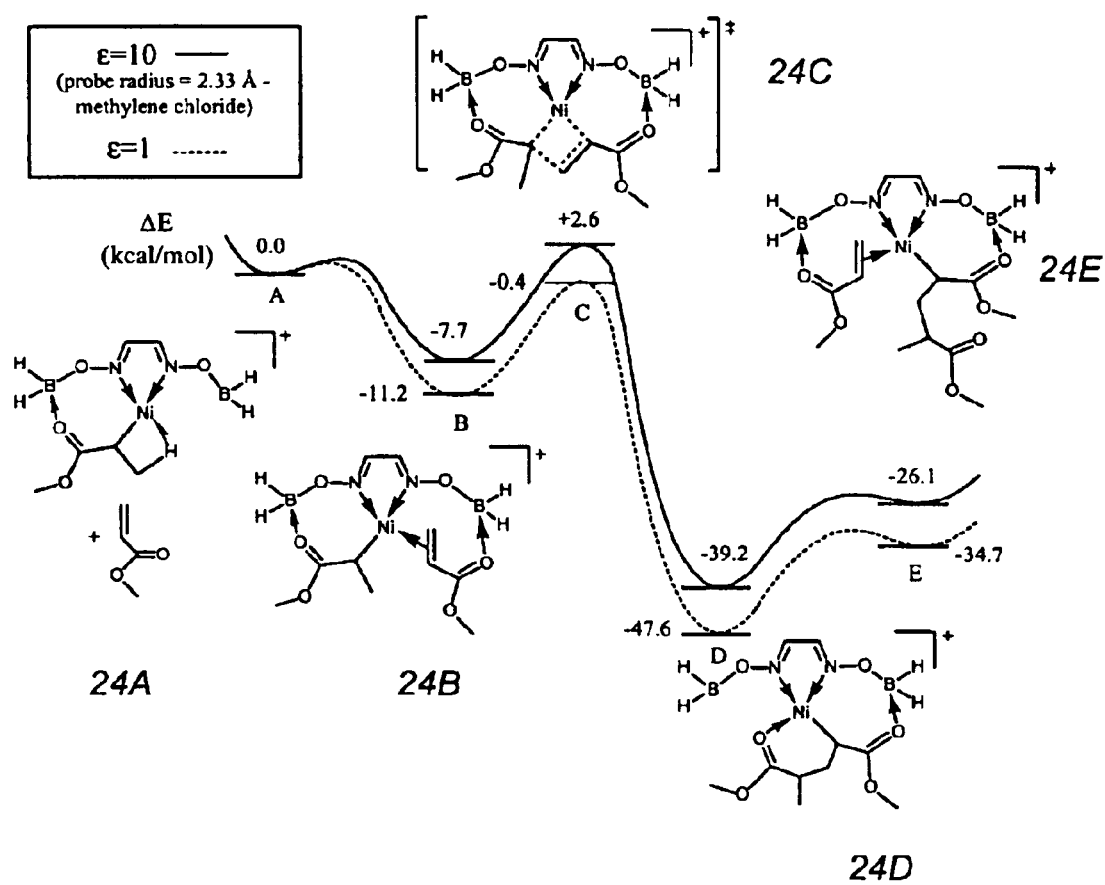
Figure 25:
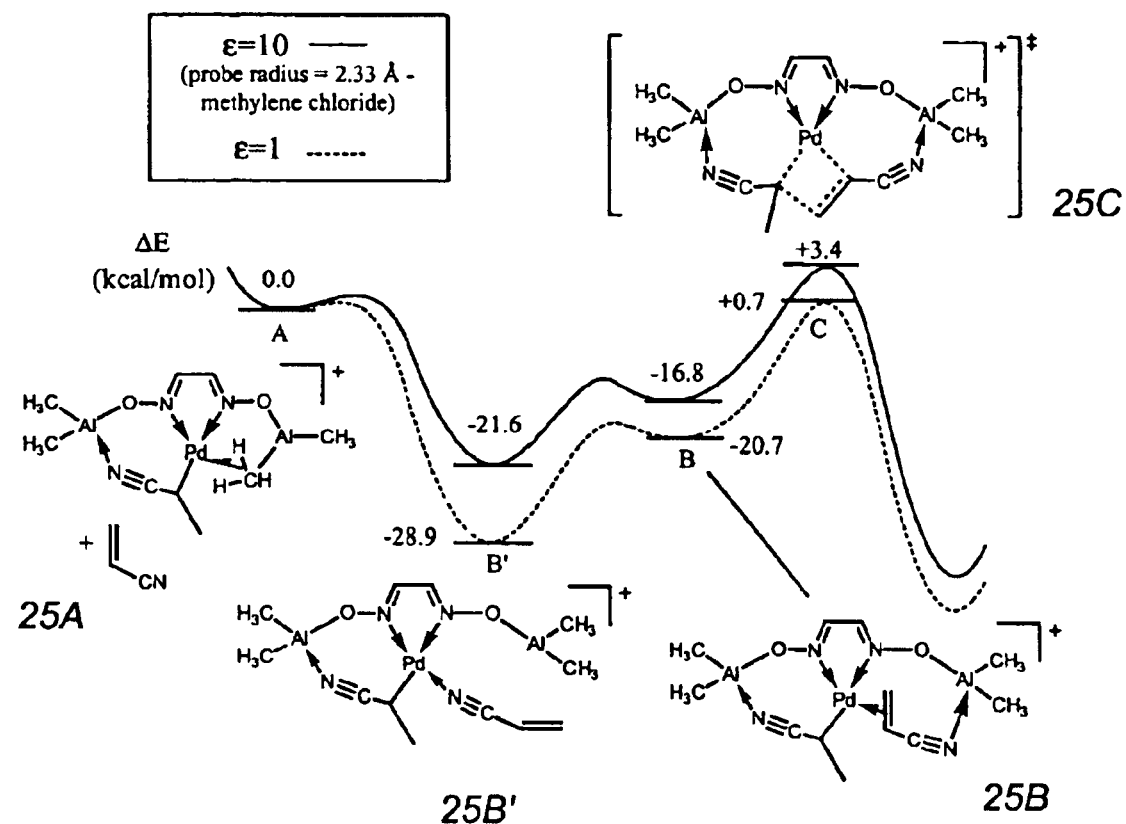
FIGS. 25–28 are potential energy diagrams for catalysts ACN1, ACN2, ACN3, and ACN4, respectively, with acrylonitrile. Solid curves include salvation effects representative of methylene chloride, and dotted curves are gas-phase results.
Figure 26:
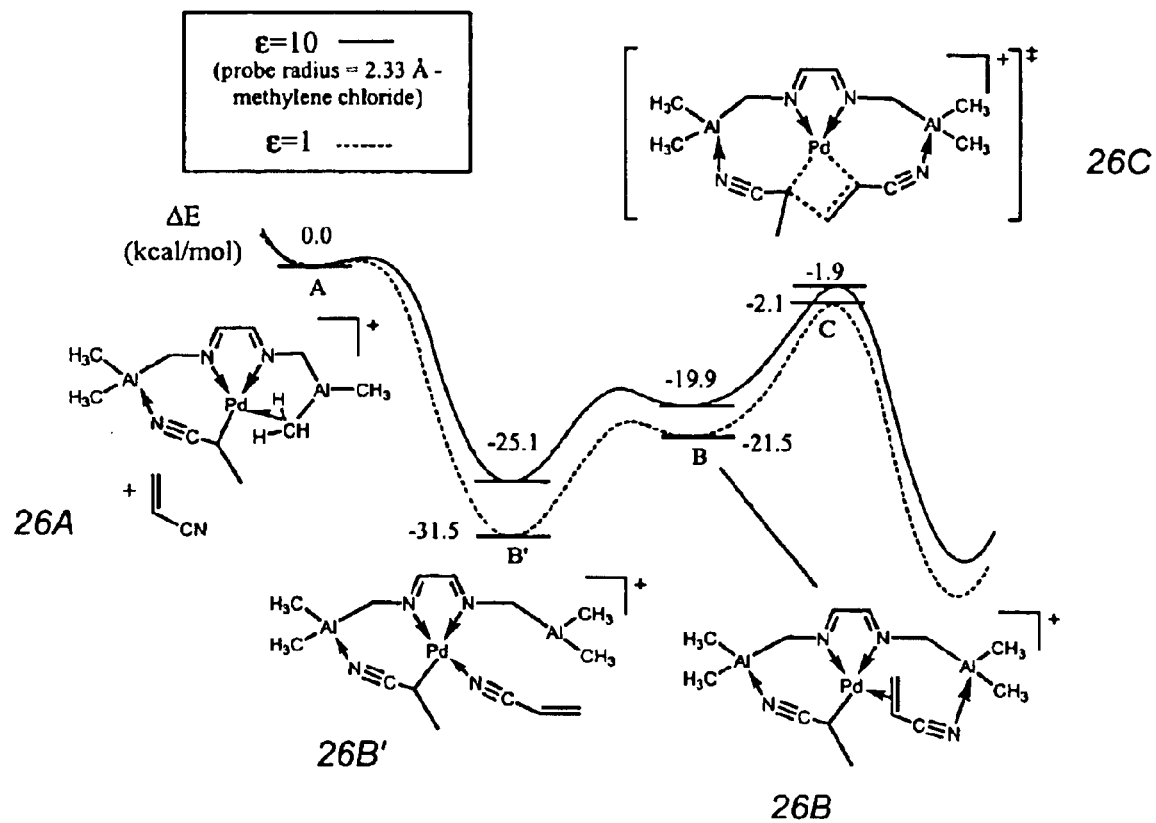
Figure 27:
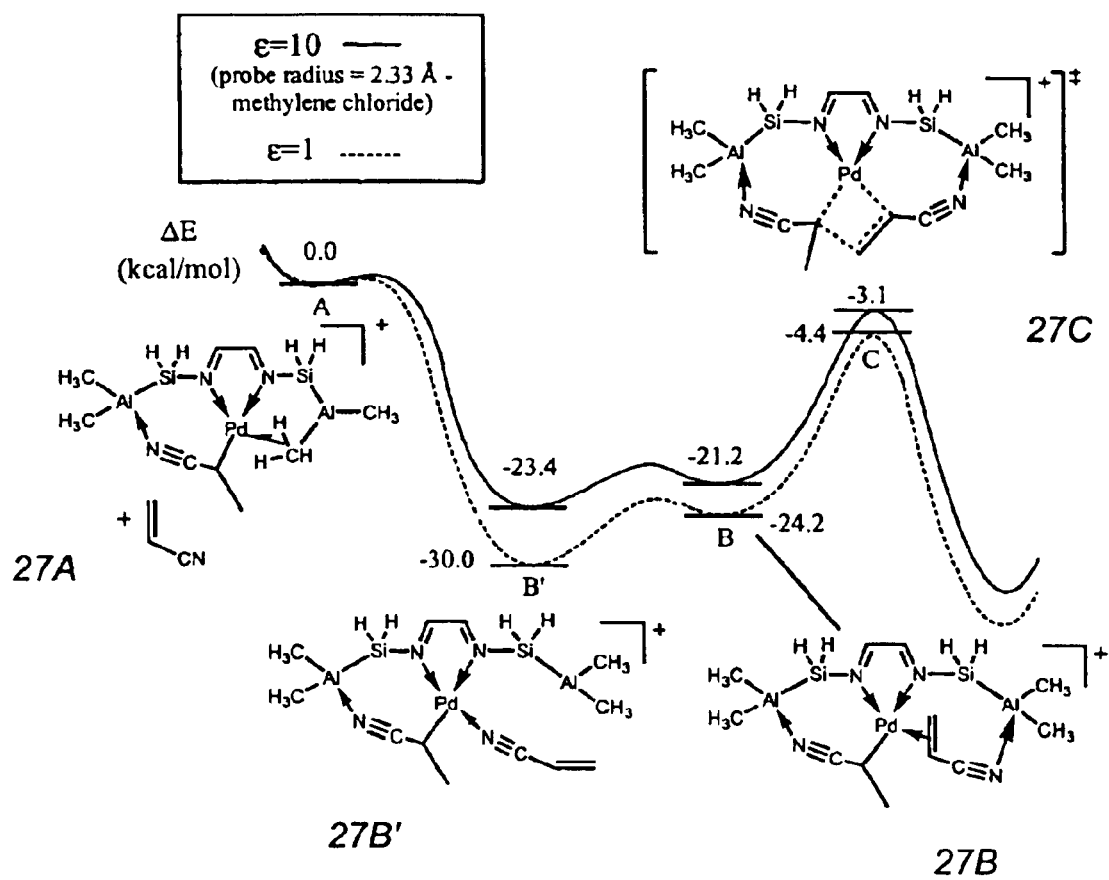
Figure 28:
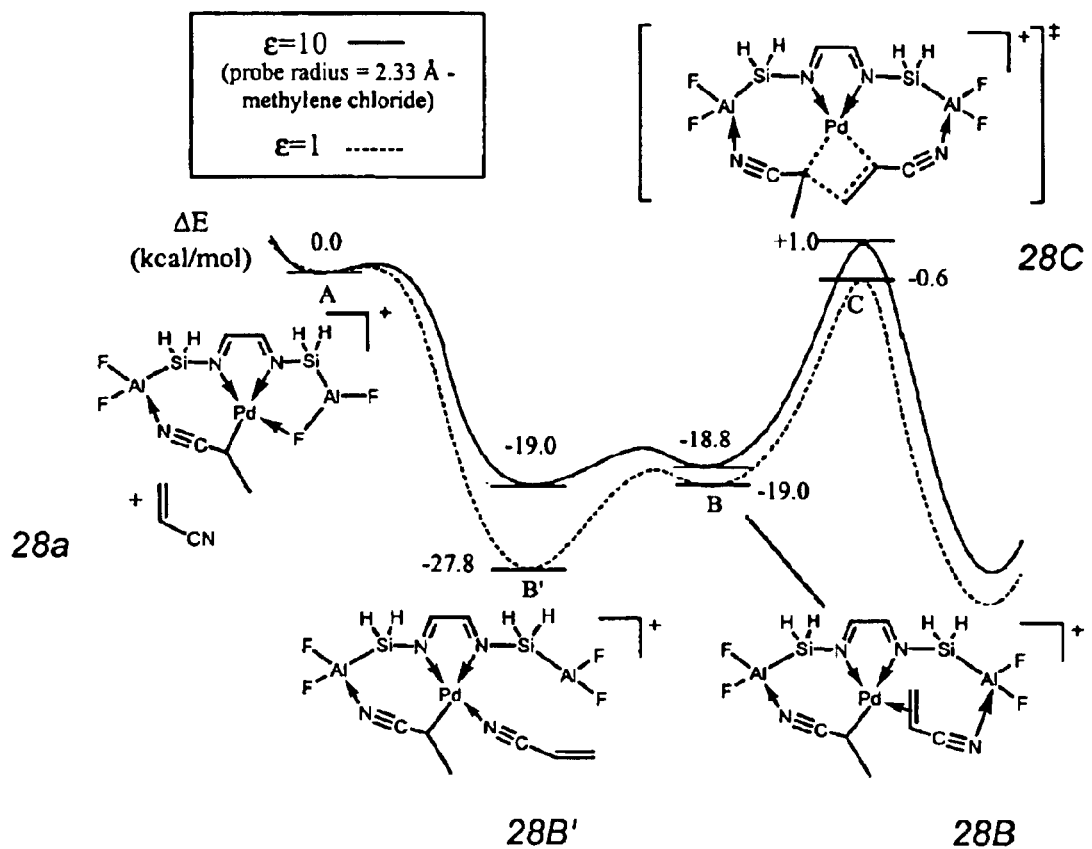

A potential poisoning pathway might arise if the carbonyl O of the vinyl acetate just inserted were able to terminate its donation to the Lewis acid and interact more strongly with the transition metal center than an incoming monomer unit would, thereby raising the effective barrier to insertion to a prohibitive level. As demonstrated in FIG. 17, however, this poisoning pathway should not present a problem. As illustrated in FIG. 17, structure 17A' is obtained from 17A by the carbonyl O ceasing its donation to the B and twisting around the Pd-(α-carbon) bond to donate to the Pd. As the resulting structure 17A' is higher in energy (by about 2 kcal/mol) than the π-complex of structure 17B, it is not expected that this pathway would present a problem. Additionally, the use of stronger Lewis acids should result in B structures even more energetically stable relative to A'.

These results demonstrate that Pd (and possibly Ni) based complexes with di-imine ligands derivatized to include Lewis acid sidegroups are viable catalysts for vinyl acetate polymerization. The examples for which the calculated catalytic properties are presented here serve as prototypes. Table 2 indicates which special cases to consider in optimizing the catalyst to yield maximum polyvinyl acetate (PVA). Incorporation of chiral centers into substituents X, Y, and Z in catalysts 1 and 2 should lead to stereoselectivity. Thus, this class of catalysts can be designed to maximize the isotactic or syndiotactic character in the PVA. This should allow greatly improved properties since the current synthetic techniques (e.g., free radical polymerization) do not allow stereo control.

Results for polymerization of methyl acrylate calculated for the four catalyst formulations MA1, MA2, MA3, and MA4 listed in Table 3 are shown in FIGS. 21–24, respectively.

TABLE 3

| Catalyst | TM | A | Y | X | $r_{A-Cl}$ (Å) |
|---|---|---|---|---|---|
| MA1 | Pd | B | O | H | 1.58 |
| MA2 | Pd | B | O | F | 1.58 |
| MA3 | Pd | Al | O | F | 1.85 |
| MA4 | Ni | B | O | H | 1.57 |

In FIGS. 21–24, the various important intermediates are labeled as follows:

A is the growing polymer bound to catalyst, with no monomer substrate. The growing polymer is represented by an ethyl chain with a —CC(O)CH$_3$ group at the ethyl α-carbon.

B is the substrate (methyl acrylate) complexed to catalyst containing growing polymer. This should be significantly lower in energy (at least 10 kcal/mol) than A.

C is the transition state for inserting the monomer into the growing polymer (leading from B to D). This should be low, below about 23 kcal/mol.

D is the N+1 polymer bound to catalyst (a new version of A). The carbonyl O that had been donating to the Lewis acid A may now be donating to the transition metal center TM, which ideally should not yield too stable a structure for further complexation and insertion to proceed.

E is the N+1 polymer bound to catalyst with the next monomer unit complexed. This should be lower than D.

As shown in FIGS. 21–24, the choice of appropriate TM, E, A, X, Y, and Z gives energetics that yield a viable catalyst for methyl acrylate.

These results can be compared to those illustrated for ethylene polymerization by Pd and Ni di-imine model catalysts in FIG. 2. The transition barriers to insertion compare quite well, and the initial complexation energies ($E_A$–$E_B$) are generally favorable (they are quite large for catalyst MA2 (FIG. 22), indicative of the strong donation of the carbonyl O to the Al). However, once another methyl acrylate unit has been added, catalysts MA1 (FIG. 21) and MA4 (FIG. 24) require energy to go uphill from structure 21D and 24D to 21E and 24E, respectively, in breaking the interaction between the carbonyl O and Ni to complex another monomer unit. For catalyst MA3 (FIG. 23), it is significantly downhill in energy (about 15 kcal/mol) to break the interaction between the carbonyl O of the previously inserted methyl acrylate and the transition metal/Lewis acid in order to complex the next monomer unit and get from structure 23D to 23E. Structures 22D and 22E are about equally stable energetically for catalyst MA2. Thus the effective insertion transition barrier for cases MA2 and MA3 is not expected to increase beyond that found from the energy ($E_C$–$E_B$).

Varying the strength of the Lewis acid can greatly affect the complexation energies (as can be seen by comparing catalyst MA2 with B to catalyst MA3 with Al). Therefore it still may be possible to favorably change the energy profile of catalyst MA4 by modifying the catalyst, for example changing the Lewis acid from B to Al.

As discussed above for vinyl acetate, a potential poisoning pathway might arise if the carbonyl O of the methyl acrylate just inserted were able to terminate its donation to the Lewis acid and interact more strongly with the transition metal center than an incoming monomer unit would, thereby raising the effective barrier to insertion to a prohibitive level. However, as demonstrated in FIG. 17 for vinyl acetate, this poisoning pathway should not present a problem. As illustrated in FIG. 4, the 5-membered ring structure 4I for vinyl acetate insertion (similar to 17A' in FIG. 17) is lower in energy than the 6-membered ring structure 3U for methyl acrylate insertion of FIG. 3 relative to the initial structures 3A and 4A in FIGS. 3 and 4. Thus, it would be expected that a poisoning pathway where an intermediate A' is obtained from A (in FIGS. 21–24) by the carbonyl O ceasing its donation to the B and twisting around the Pd-(α-carbon) bond to donate to the Pd would be less favorable than for vinyl acetate. Therefore this rearrangement should not be a problem for methyl acrylate, though those skilled in the art will recognize that the use of stronger Lewis acids should result in B structures even more energetically stable relative to an analogous A'.

These results demonstrate that Pd (and possibly Ni) based complexes with di-imine ligands derivatized to include Lewis acid sidegroups are viable catalysts for methyl acrylate polymerization. The examples for which the calculated catalytic properties are presented here serve as prototypes. Table 3 indicates which special cases to consider in optimizing the catalyst to yield maximum polymethyl acrylate (PMA). Incorporating chiral centers into substituents X, Y, and Z should lead to stereoselectivity. Thus, this class of catalysts can be designed to maximize the isotactic or syndiotactic character in the PMA. This should allow greatly improved properties since the current synthetic techniques (e.g., free radical polymerization) do not allow stereo control.

Results for polymerization of acryonitrile calculated for the four catalyst formulations ACN1, ACN2, ACN3, and ACN4 listed in Table 4 are shown in FIGS. 25–28, respectively.

TABLE 4

| Catalyst | TM | A | Y | X | $r_{A-Cl}$ (Å) |
|---|---|---|---|---|---|
| ACN1 | Pd | Al | O | CH$_3$ | 2.02 |
| ACN2 | Pd | Al | CH$_2$ | CH$_3$ | 2.06 |
| ACN3 | Pd | Al | SiH$_2$ | CH$_3$ | 2.06 |
| ACN4 | Pd | Al | SiH$_2$ | F | 1.98 |

In FIGS. 25–28, the various important intermediates are labeled as follows:

A is the growing polymer bound to catalyst, with no monomer substrate. The growing polymer is represented by an ethyl chain with a cyano group at the ethyl α-carbon.

B is the substrate (acrylonitrile in this case) complexed to catalyst containing growing polymer. This should be significantly lower in energy (at least 10 kcal/mol) than A.

B' is the substrate complexed through a σ-mode to the catalyst containing growing polymer. This should ideally be higher in energy than B, or at least not significantly lower in energy than B such that the transition barrier to reach C will be too large.

C is the transition state for inserting the monomer into the growing polymer (leading from B to D). This should be low, below about 23 kcal/mol.

As shown in FIGS. 25–28, the choice of appropriate TM, E, A, X, Y, and Z gives energetics that yield a viable catalyst for acrylonitrile.

These results can be compared to those illustrated for ethylene polymerization by Pd and Ni di-imine model catalysts in FIG. 2. Because it appears that an unusually stable σ-complex (structure 6B in FIG. 6) for acrylonitrile leads to prohibitively large barriers to insertion for the Brookhart Pd di-imine catalyst, special attention is paid to the relative energy of structure B' (the σ-complex) in FIGS. 25–28. Intermediates 25B' and 26B' are about 5 kcal/mol more stable than the π-complex 25B and 26B for catalyst ACN1 (FIG. 25) and ACN2 (FIG. 26), respectively, but the analogous intermediate 27B' is only about 2 kcal/mol more stable for catalyst ACN3 (FIG. 27) and is practically even in energy for ACN4 (28B' in FIG. 28). These lead to reasonably low overall barriers to insertion for catalysts ACN3 and ACN4 (at around 20 kcal/mol), while the barriers are significantly higher for ACN1 (about 25 kcal/mol) and ACN2 (about 23 kcal/mol Varying the strength of the Lewis acid can greatly affect the relative stability of the σ-complex compared to the π-complex. Another important factor for acrylonitrile is the length of the arms, as longer arms can allow for a more optimal donation from the cyano nitrogen to the Lewis acid. This is especially evident when comparing catalyst ACN2, in which the linking group is $CH_2$, to ACN3, where the linking group is $SiH_2$, which results in longer arms. Together, varying Lewis acid strength and arm length (including extending linking groups to longer than one unit in length—e.g., by using —$CH_2CH_2$— or —$OCH_2$—) can be instrumental in finding an optimal catalyst for acrylonitrile.

These results demonstrate that Pd based complexes with di-imine ligands derivatized to include Lewis acid sidegroups are viable catalysts for acrylonitrile polymerization. The examples for which the calculated catalytic properties are presented here serve as prototypes. Table 4 indicates which special cases to consider in optimizing the catalyst to yield maximum polyacrylonitrile. Incorporating chiral centers into substituents X, Y, and Z should lead to stereoselectivity. Thus, this class of catalysts can be designed to maximize the isotactic or syndiotactic character in the polyacrylonitrile. This should allow greatly improved properties since the current synthetic techniques (e.g., free radical polymerization) do not allow stereo control.

It should be noted that the potential energy curves calculated for addition of polar monomers to ILA-SS-POPC catalysts 1 and 2 are similar to curves calculated for polymerization of ethylene by the Brookhart-type Pd and Ni di-imine polyethylene catalysts. Thus, the ILA-SS-POPC catalysts 1 and 2 should produce co-polymers of vinyl chloride with non-polar olefins (e.g. ethylene or propylene). Indeed, by varying the length of the Y group, the catalysts can be optimized for the production of homo and co-polymers involving polar monomers. The strong interaction of the polar group with the transition metal center is a significant problem with current catalysts for the homo and co-polymerization of polar monomers. This creates a structure that is too stable (or even essentially impossible) for insertion of the next monomer. The ILA-SS-POPC catalysts 1 and 2 alleviate this problem by keeping the polar group "occupied" by the Lewis acid sidegroups, and additionally maintain head-to-tail regioselectivity by preventing rearrangement.

ILA-SS-POPC catalysts of formulas 1 and 2 can be prepared from precursor compounds characterized by the general formula 3:

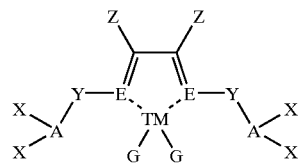

3 where TM, A, E, X, Y and Z are defined as for compounds 1 and 2 above, and where G is a group such as a halide or $CH_3$ that is exchangeable—for example in the presence of a cocatalyst (such as MAO or triarylboranes). The net effect of a cocatalyst on this precursor is to exchange one G group with $CH_3$ (if it is not already a methyl group) and to remove the other G to yield a cationic charge on the metal. This results in the active species for the catalyst. Optionally, compounds according to formula 3 can also include one or more additional ligands as described above to satisfy additional coordination sites of metal center TM, and/or to adjust the metal's oxidation state.

Scheme 2

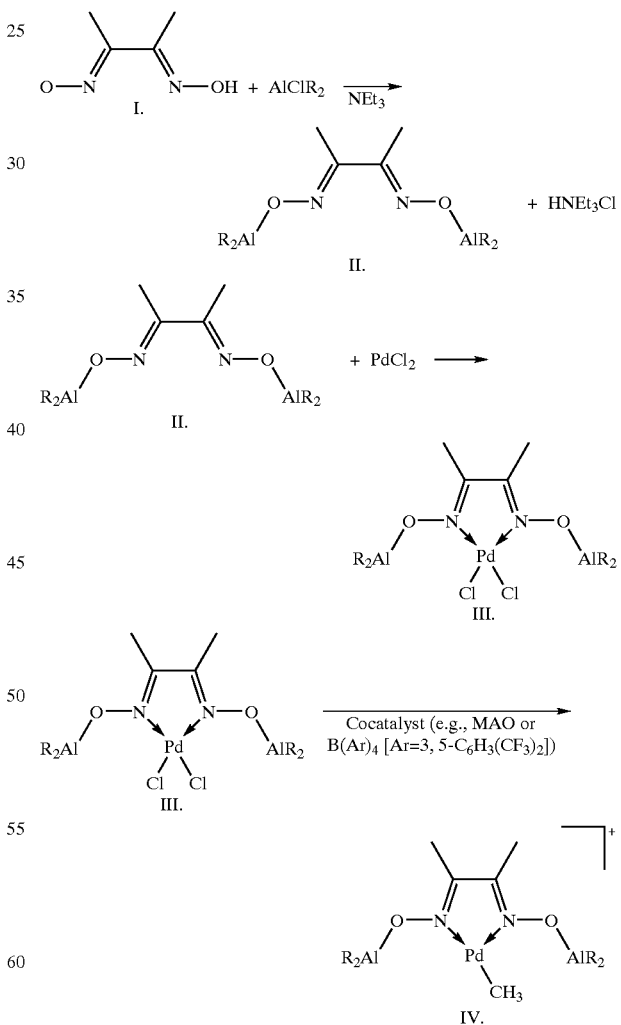

$R=Ph(C_6H_5), Et(C_2H_5), C_6F_5$, or other R

Although catalysts of formulas 1 and 2 do not appear to have been reported in the literature, those skilled in the art will recognize known synthetic methods by which such compounds could be prepared. Thus, according to one possible approach illustrated in Scheme 2, a catalyst IV (corresponding to a compound of formula 1 in E=N, TM=Pd, A=Al, Y=O, X=R (such as Ph), Z=CH$_3$, L=Cl, and n=1) could be prepared via precursor III starting from the di-alcohol I. Coupling with AlR$_2$Cl (e.g., R=Ph) yields compound II, which could then be reacted with PdCl$_2$ to form precursor III. This precursor could then be activated by standard cocatalysts such as MAO or B(Ar)$_4$ (where Ar=3, 5-C$_6$H$_3$(CF$_3$)$_2$) to give the active species IV.

Those skilled in the art will recognize that the ILA-SS-POPC catalysts 1 and 2 described herein should be useful to polymerize polar olefin monomers (such as methyl acrylate) using standard procedures such as those used by Brookhart (for an example, see S. Mecking, et al., *J. Am. Chem. Soc.* 1998, 120, 888). Thus, a polymerization might begin with the formation of a solution of the precursor III in a solvent such as methylene chloride or other suitable solvent, along with a standard cocatalyst (e.g., MAO or B(Ar)$_4$) using standard equipment (such as Schlenk flask/tube and Schlenk line or Parr reactor) and under standard inert conditions. The polar monomer is added to the solution, stirred, and allowed to react for up to several days at temperatures ranging from about 0° C. to about 100° C. and at pressures ranging from about 1 atm to about 50 atm. A similar procedure could be used to form copolymers, except that two monomers (which could include two polar monomers, or one polar monomer and one non-polar monomer, such as ethylene) are added to the precursor/cocatalyst solution and allowed to react as above.

A number of embodiments of the invention have been described. Nevertheless, it will be understood that various modifications may be made without departing from the spirit and scope of the invention. For example, the ILA-SS-POPC catalysts have been described in the context of the production of homo- and co-polymers of vinyl chloride, vinyl acetate, methyl acrylate and acrylonitrile. Those skilled in the art will recognize that the computational techniques described herein can be readily applied to identify catalyst systems for other monomers without due experimentation. Accordingly, other embodiments are within the scope of the following claims.

What is claimed is:

1. A catalyst composition for use in an olefin polymerization process, the catalyst composition comprising:

a late transition metal selected from the group consisting of IUPAC convention Group 7 (Mn column), Group 8 (Fe column), Group 9 (Co column), Group 10 (Ni column) and Group 11 (Cu column) transition metals; and a ligand complexed with the late transition metal; the ligand being characterized by the general formula:

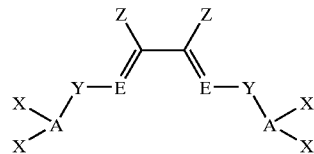

wherein
each E is N;
each Y is a linking group independently selected from the group consisting of —O—, —NR—, —CR$_2$—, —S—, —PR—, —SiR$_2$—, and —G(CR$_2$)$_m$—, where each R is a substituent independently selected from the group consisting of H, halide, alkyl, substituted alkyl, heteroalkyl, aryl, substituted aryl, and heteroaryl, and where one or more R substituents can be incorporated in a ring structure, G is selected from the group consisting of O, N, and CR$_2$, and m is an integer greater than or equal to 1;
each A is a Lewis acid;
each X is an electron-withdrawing group independently selected from the group consisting of Cl, F, Br, I, CF$_3$, C$_6$F$_5$, H, alkyl, C$_6$H$_5$, C$_6$R$_5$, and CR$_3$, where each R is a substituent independently selected from the group consisting of H, halide, alkyl, substituted alkyl, heteroalkyl, aryl, substituted aryl, and heteroaryl, and where one or more R substituents can be incorporated in a ring structure;
each Z is a substituent independently selected from the group consisting of H, halide, alkyl, substituted alkyl, heteroalkyl, aryl, substituted aryl, and heteroaryl, where one or more of X, Y and/or Z can be incorporated in a ring structure;
wherein the late transition metal is also complexed with one or more additional ligands selected from the group consisting of ligands that are capable of adding to an olefin in a polymerization process and ligands that are capable of being displaced by the olefin.

2. The composition of claim 1, wherein:
each A is independently independently selected from the group consisting of Al, B, Ga, In, Tl, Sc, Y, La and Lu.

3. The composition of claim 1, wherein:
the late transition metal is nickel, palladium or platinum.

4. The composition of claim 1, wherein:
the late transition metal is nickel, palladium or platinum;
A is aluminum or scandium;
Y is —O—, —S—, or —CH$_2$—;
X is Cl, F, CF$_3$ or H; and
Z is H.

5. A process for polymerizing at least one polar olefinic monomer, comprising:
contacting a catalyst composition according to claim 1 with at least one polar olefinic monomer under polymerization conditions sufficient to polymerize the at least one polar olefinic monomer.

* * * * *